US011526373B2

(12) United States Patent
Belikovetsky et al.

(10) Patent No.: US 11,526,373 B2
(45) Date of Patent: *Dec. 13, 2022

(54) AGENTLESS PERSONAL NETWORK FIREWALL IN VIRTUALIZED DATACENTERS

(71) Applicant: Interwise Ltd., Airport City (IL)

(72) Inventors: Sofia Belikovetsky, Petah Tikva (IL); Ofer HaCohen, Ramat Hasharon (IL)

(73) Assignee: Interwise Ltd., Airport City (IL)

( * ) Notice: Subject to any disclaimer, the term of this patent is extended or adjusted under 35 U.S.C. 154(b) by 207 days.

This patent is subject to a terminal disclaimer.

(21) Appl. No.: 16/987,445

(22) Filed: Aug. 7, 2020

(65) Prior Publication Data

US 2020/0364076 A1 Nov. 19, 2020

Related U.S. Application Data

(63) Continuation of application No. 16/105,619, filed on Aug. 20, 2018, now Pat. No. 10,740,134.

(51) Int. Cl.
*G06F 9/455* (2018.01)
*H04L 9/40* (2022.01)

(52) U.S. Cl.
CPC ...... *G06F 9/45558* (2013.01); *H04L 63/0272* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS 7,725,559 B2  5/2010 Landis et al.
7,802,250 B2  9/2010 Uhlig et al.
(Continued)

FOREIGN PATENT DOCUMENTS

WO  WO 2004/111785  12/2004
WO  WO 2014/166247  10/2014
(Continued)

OTHER PUBLICATIONS

Bazzi et al., "Feasibility Study of Security Virtual Appliances for Personal Computing," Journal of Information Processing, Jul. 2011, vol. 19, pp. 378-388.
(Continued)

*Primary Examiner* — Craig C Dorais
(74) *Attorney, Agent, or Firm* — Hartman & Citrin LLC

(57) ABSTRACT

Concepts and technologies directed to agentless personal firewall security in virtualized datacenters are disclosed herein. Embodiments can include a computer system that can host a hypervisor via a memory and a processor. Upon execution, the processor can cause the computer system to perform operations. The operations can include receiving an inbound communication request to a virtual machine associated with the hypervisor. The operations also can include identifying a virtual port associated with the virtual machine based on the inbound communication request. The operations can include determining that the inbound communication request lacks an identity of a virtual application process that executes on the virtual machine. The operation also can include building a virtual machine memory map. The operation also can include forcing exposure of the virtual application process based on the virtual machine memory map.

20 Claims, 7 Drawing Sheets

(56) References Cited

U.S. PATENT DOCUMENTS

| | | | |
|---|---|---|---|
| 8,146,145 | B2 | 3/2012 | Hyndman et al. |
| 8,412,945 | B2 | 4/2013 | Sweet et al. |
| 8,473,627 | B2 | 6/2013 | Astete et al. |
| 8,972,978 | B2 | 3/2015 | Astete et al. |
| 9,065,804 | B2 | 6/2015 | Sweet et al. |
| 9,178,828 | B2 | 11/2015 | Kumar et al. |
| 9,270,596 | B2 | 2/2016 | Parker |
| 9,396,011 | B2 | 7/2016 | Zeng et al. |
| 9,716,688 | B1 | 7/2017 | Emelyanov et al. |
| 9,749,218 | B1 | 8/2017 | Felstaine et al. |
| 9,766,943 | B2 | 9/2017 | Blanco et al. |
| 9,843,624 | B1 | 12/2017 | Taaghol et al. |
| 2011/0269111 | A1* | 11/2011 | Elesseily ............... G09B 23/28 434/362 |
| 2013/0263125 | A1* | 10/2013 | Shamsee ............. G06F 9/45558 718/1 |
| 2016/0006696 | A1 | 1/2016 | Donley et al. |
| 2016/0239330 | A1 | 8/2016 | McBride et al. |
| 2017/0048200 | A1 | 2/2017 | Chastain |
| 2017/0054685 | A1 | 2/2017 | Malkov et al. |
| 2017/0093640 | A1 | 3/2017 | Subramanian et al. |
| 2017/0163685 | A1 | 6/2017 | Schwartz et al. |
| 2017/0185436 | A1 | 6/2017 | Deng et al. |
| 2017/0279668 | A1 | 9/2017 | Shevenell et al. |
| 2017/0371692 | A1 | 12/2017 | Connolly et al. |
| 2017/0372070 | A1 | 12/2017 | Burdett et al. |

FOREIGN PATENT DOCUMENTS

| | | |
|---|---|---|
| WO | WO 2015/164521 | 10/2015 |
| WO | WO 2016/180181 | 11/2016 |

OTHER PUBLICATIONS

Poisel et al., "Evidence and Cloud Computing: The Virtual Machine Introspection Approach," Journal of Wireless Mobile Networks, Ubiquitous Computing, and Dependable Applications, Mar. 2013, vol. 4, No. 1, pp. 135-152.

Sadri, Sahba, "Towards Migrating Security Policies along with Virtual Machines in Cloud," Dissertation, Concordia University, Dec. 2013.

Tsugawa, Maurício, "On the Design, Performance, and Management of Virtual Networks for Grid Computing," Dissertation, University of Florida, Aug. 2009.

Chen et al., "Research and Practice of Dynamic Network Security Architecture for IaaS Platforms," Tsinghua Science and Technology, Oct. 2014, vol. 19, No. 5, pp. 496-507.

LibVMI, "Introduction to LibVMI," LibVMI.com, retrieved at http://libvmi.com/docs/gcode-intro.html on May 30, 2018.

U.S. Notice of Allowance dated Mar. 26, 2020 in U.S. Appl. No. 16/105,619.

* cited by examiner

AGENTLESS PERSONAL NETWORK FIREWALL IN VIRTUALIZED DATACENTERS

CROSS-REFERENCE TO RELATED APPLICATIONS

This application is a continuation of and claims priority to U.S. patent application Ser. No. 16/105,619, entitled "Agentless Personal Network Firewall in Virtualized Datacenters," filed Aug. 20, 2018, now U.S. Pat. No. 10,740,134, which is incorporated herein by reference in its entirety.

BACKGROUND

In modern datacenters, the physical host networking devices may be distributed across various locations. Through virtualized network architecture, the physical host networking devices can provide a virtual datacenter that appears cohesive to a user data plane. Telecommunication service providers can implement network virtualization platforms to share virtualized infrastructure that supports multiple communication services and network applications (including real-time and non-real-time applications). The majority of network traffic in most datacenters can occur internally, that is, between virtual machines and host devices that are included within the datacenter. Conventional systems may not monitor or screen network traffic that is internal to a virtualized datacenter. However, a compromised workload executing on one virtual or physical machine may attempt to laterally spread or migrate within the datacenter. In some instances, a compromised workload may attempt to connect with unauthorized servers that are within the datacenter and/or outside of the datacenter so as to relay sensitive information about the datacenter to a nefarious third party. In some conventional systems, each virtual machine may implement a personal firewall agent that is controlled from within the virtual machine. However, if a virtual machine is already compromised despite the personal firewall agent on the virtual machine, there remains the potential for compromised or otherwise malicious workloads to spread to other virtual machines. As such, the conventional techniques of implementing additional personal firewall agents on each virtual machine within a datacenter can dramatically reduce processing and memory resource capacity, while also slowing network efficiency due to increased maintenance of multiple virtual machines. Therefore, conventional approaches to addressing network vulnerabilities will not scale up in the highly virtualized, real-time, and dynamic environment of modern datacenters.

SUMMARY

The present disclosure is directed to an agentless personal network firewall in virtualized datacenters. According to one aspect of the concepts and technologies disclosed herein, a system is disclosed. In some embodiments, the system can include a processor and a memory. The processor and the memory can support and provide a hypervisor. The hypervisor can support one or more virtual machines. The memory can store computer-executable instructions that, when executed by the processor, cause the processor to perform operations. In some embodiments, the operations can include receiving an inbound communication request to a virtual machine associated with the hypervisor. The operations also can include identifying a virtual port associated with the virtual machine based on the inbound communication request. The operations can include determining that the inbound communication request lacks an identity of a virtual application process that executes on the virtual machine. The operations also can include building a virtual machine memory map. The virtual machine memory map can be built via access to the hypervisor. In some embodiments building the virtual machine memory map can include reconstructing a kernel socket data structure corresponding to the virtual machine. The operations also can include forcing exposure of the virtual application process based on the virtual machine memory map. In some embodiments, the kernel socket data structure can force exposure and identify the virtual application process by identifying a virtual socket associated with the virtual port, and can indicate the virtual application process associated with the virtual socket.

In some embodiments, the operations can further include inspecting endpoint message criteria of the inbound communication request. In some embodiments, the endpoint message criteria can include a source internet protocol address, a source port, a destination internet protocol address, a destination port, and a protocol type. In some embodiments, the endpoint message criteria can include data from the virtual machine by which to apply a filter, such as but not limited to, the permissions of the virtual application process that is running. The operations also can include pulling access parameters to determine whether the inbound communication request is permitted to access the virtual application process. In response to determining that the inbound communication request is permitted to access the virtual application process, the operations also can include routing the inbound communication request to the virtual port, according to an embodiment. In response to determining that the inbound communication request is not permitted to access the virtual application process, the operations can include preventing the inbound communication request from reaching the virtual port, according to an embodiment. In some embodiments, the operations can further include querying the hypervisor to confirm that a personal firewall agent is not presently executing on the virtual machine. In some embodiments, the operations can include determining that a personal firewall agent is executing on the virtual machine, and in response, can halt execution and remove the personal firewall agent from the virtual machine.

According to another aspect of the concepts and technologies disclosed herein, a method is disclosed, according to an embodiment. The method can include receiving, by a processor that hosts a hypervisor of a computer system within a data center, an inbound communication request to a virtual machine associated with the hypervisor. In some embodiments, the processor can execute a hypervisor firewall application that can instruct the hypervisor, monitor, and manage communication messages going to and/or coming from a virtual machine supported by the hypervisor. The method also can include identifying, by the processor that hosts the hypervisor, a virtual port associated with the virtual machine based on the inbound communication request. The method also can include determining, by the processor that hosts the hypervisor, that the inbound communication request lacks an identity of a virtual application process that executes on the virtual machine. The method also can include building, by the processor that hosts the hypervisor, a virtual machine memory map. The virtual machine memory map can be built via access to the hypervisor to identify a virtual machine page directory based on a destination port indicated in the inbound communication request. The method also can include forcing, by the processor that hosts the hypervisor, exposure of the virtual application process based on the virtual machine memory map.

In some embodiments, the method can further include inspecting endpoint message criteria of the inbound communication request. In some embodiments, the endpoint message criteria can include one or more of a source internet protocol address, a source port, a destination internet protocol address, a destination port, and a protocol type. The method also can include pulling access parameters to determine whether the inbound communication request is permitted to access the virtual application process. In an embodiment, the method also can include routing the inbound communication request to the virtual port. In some embodiments, routing the inbound communication request to the virtual port can occur in response to determining that the inbound communication request is permitted to access the virtual application process. In some embodiments, the method also can include preventing the inbound communication request from reaching the virtual port. In some embodiments, preventing the inbound communication request from reaching the virtual port can occur in response to determining that the inbound communication request is not permitted to access the virtual application process. In some embodiments, building the virtual machine memory map can include reconstructing a kernel socket data structure corresponding to the virtual machine. In some embodiments, the kernel socket data structure can force exposure and identify the virtual application process by identifying a virtual socket associated with the virtual port, and indicate the virtual application process associated with the virtual socket. In some embodiments, the method can further include querying the hypervisor to confirm that a personal firewall agent is not presently executing on the virtual machine.

According to yet another aspect, a computer storage medium is disclosed. The computer storage medium can have computer-executable instructions stored thereon. When the computer-executable instructions are executed by a processor, the processor can perform operations. In some embodiments, the processor can be included in a computer system that supports, hosts, and/or otherwise provides a hypervisor. The hypervisor can support the execution and processing of one or more virtual machines. In some embodiments, the operations can include receiving an inbound communication request to a virtual machine associated with the hypervisor. The operations also can include identifying a virtual port associated with the virtual machine based on the inbound communication request. The operations also can include determining that the inbound communication request lacks an identity of a virtual application process that executes on the virtual machine. The operations also can include building a virtual machine memory map. The virtual machine memory map can be built via the hypervisor access to the hypervisor so as to identify a virtual machine page directory based on a destination port indicated in the inbound communication request. In some embodiments, the operations also can include forcing exposure of the virtual application process based on the virtual machine memory map.

In some embodiments, the operations can include inspecting endpoint message criteria of the inbound communication request. The operations also can include pulling access parameters to determine whether the inbound communication request is permitted to access the virtual application process. In some embodiments, the operations can include routing the inbound communication request to the virtual port. The routing of the inbound communication request to the virtual port can occur in response to determining that the inbound communication request is permitted to access the virtual application process. In some embodiments, the operations can include preventing the inbound communication request from reaching the virtual port. In some embodiments, preventing the inbound communication request from reaching the virtual port can occur in response to determining that the inbound communication request is not permitted to access the virtual application process. In some embodiments, building the virtual machine memory map can include reconstructing a kernel socket data structure corresponding to the virtual machine. In some embodiments, the kernel socket data structure can force exposure and identify the virtual application process by identifying a virtual socket associated with the virtual port, and indicate the virtual application process associated with the virtual socket. In some embodiments, the operations can further include querying the hypervisor to confirm that a personal firewall agent is not presently executing on the virtual machine.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
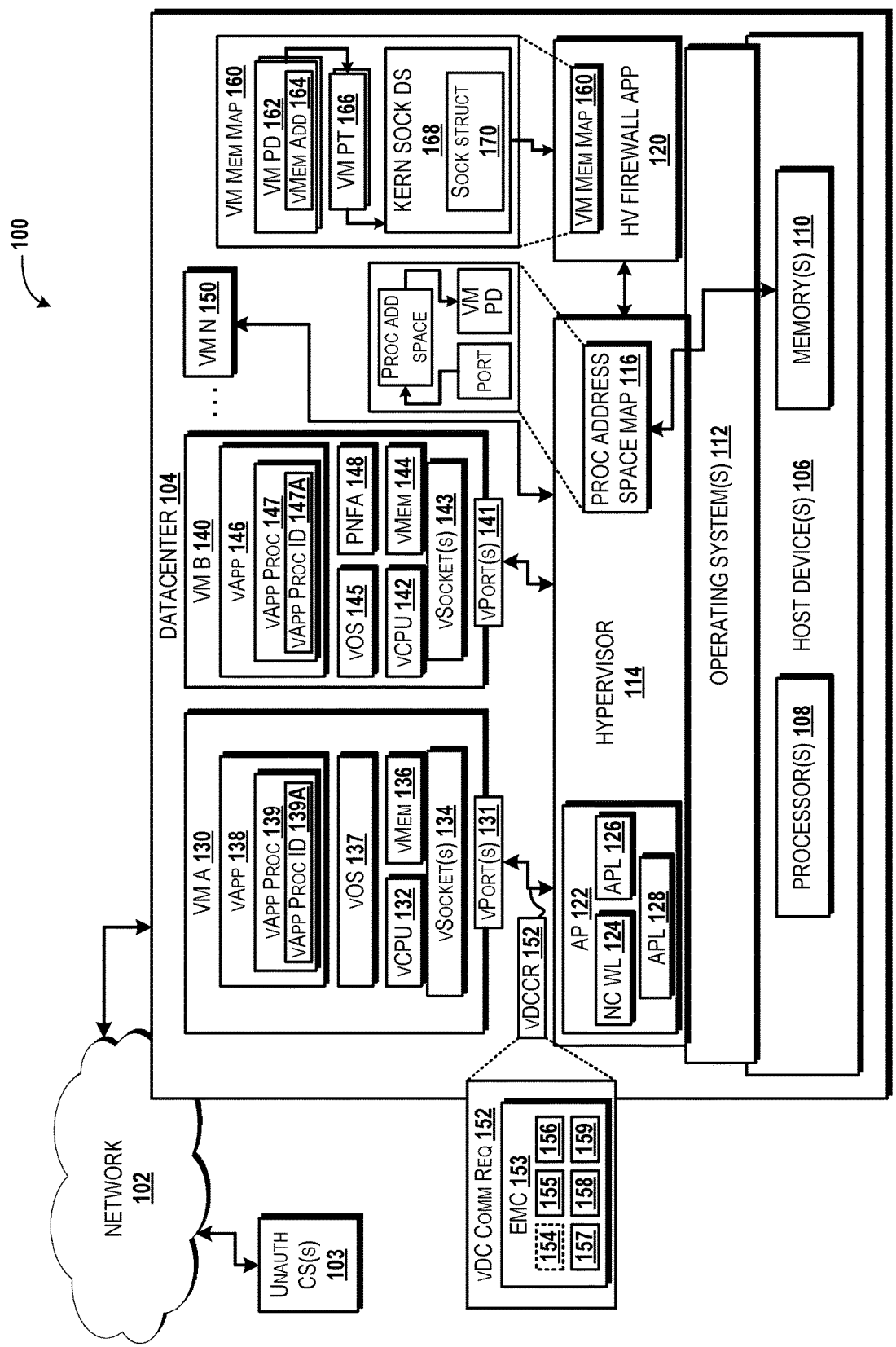
FIG. 1 is a block diagram illustrating an example operating environment in which aspects of an agentless personal network firewall system can be implemented in virtualized datacenters, according to an illustrative embodiment.

The following detailed description is directed to agentless personal network firewall security for virtualized datacenters. Conventional datacenters that implement virtualized services through the execution of multiple virtual machines may attempt to guard against internal cyber-attacks (e.g., when one virtual machine becomes compromised due to a malicious and/or nefarious process that sends unauthorized communications to other virtual machines and/or to unauthorized computing systems outside of the data center) by requiring that each virtual machine include a separate instance of a personal network firewall agent. A personal network firewall agent refers to an application and/or program that is installed on one virtual machine instance and monitors bidirectional communications only for that one virtual machine. As such, conventional datacenters that implement tens, hundreds, and/or thousands of virtual machines would require an equal amount of personal network firewall agents, with each agent requiring a separate configuration that may rely on manual modifications by a network administrator. Moreover, when a malfunction or infected process occurs within one personal network firewall agent executing on one virtual machine, the remaining personal firewall agents executing on other virtual machines may not be aware of the compromised personal network firewall agent, thereby leaving the entire datacenter exposed from within. Thus, conventionally, virtual machines may not be considered trusted to each other, and thus conventional systems place a personal network firewall agent within each virtual machine. In some embodiments, a personal network firewall agent may provide complex network connection rules, such as a certain process instance on one virtual machine may only be allowed to communicate with another certain process on another virtual machine. The multiple instances of personal network firewall agents running within the datacenter can reduce processor and memory availability due to the amount of processing and memory resources dedicated to multiple instances of the personal network firewall agents. This can reduce the efficiency of datacenter resources and increase operating costs.

As such, concepts and technologies disclosed herein can provide agentless personal network firewall security for virtualized datacenters by removing the conventional requirement of each virtual machine having its own instance of a personal network firewall agent. Embodiments of the present disclosure include a datacenter that provides a hypervisor executing via one or more host devices that provide physical network functions, such as processing resources and memory resources. The hypervisor is in communication with a single instance of a hypervisor firewall that is an application that resides at the same network layer as the hypervisor. The hypervisor firewall can be referred to as a hypervisor firewall application that has access to the hypervisor and executes separate to and/or in parallel with the hypervisor. The hypervisor supports a plurality of virtual machines that execute within a user space of the datacenter. Each of the virtual machines can include virtual computing resources that are managed by the hypervisor. The hypervisor may not have direct access to the virtual machines due to privacy concerns, and thus the virtual applications executing on each of the virtual machines may not be visible to the hypervisor. As such, each virtual machine may not fulfill a request by the hypervisor that seeks to determine which virtual application and virtual application process is running within the virtual machine. In some embodiments, one, more than one, and/or each virtual machine do not contain (i.e., do not store and/or execute using virtual processor and/or virtual memory resources within a virtual machine) an instance of a personal network firewall agent for network security. The hypervisor firewall can be the sole instance of an application (or any other type of computer-instruction) that provides firewall security for a plurality of virtual machines supported by the hypervisor, without the hypervisor firewall (or agents or modules associated therewith) residing within any of the virtual machines that are supported by the hypervisor. The hypervisor firewall can monitor communication requests (also referred to as messages) directed to (i.e., inbound) and/or coming from (i.e., outbound) the plurality of virtual machines supported by the hypervisor. Although the hypervisor firewall may be restricted from requesting information directly from each virtual machine (e.g., may not have access credentials to access the virtual machine via a virtual port and/or may not receive a response from a virtual machine when the hypervisor firewall requests information about which virtual applications and/or virtual applications processes are running within the virtual machine behind a virtual port), the hypervisor firewall can force exposure of the virtual applications and virtual application processes running within the virtual machine that is associated with the virtual port. As used herein, the phrase "force exposure" (or variants thereof such as "forcing exposure") refers to identifying data and processes associated with a virtual machine and/or virtual application without installing anything within the virtual machine (e.g., by relying on a personal firewall agent within a virtual machine), and exposing an identity of a virtual application and/or a virtual process of the virtual application that is listening to, bound to, or otherwise associated with a virtual port of the virtual machine that is being targeted or otherwise indicated in a communication request. Stated simply, "forcing exposure" can include exposing an identity of a virtual application, a virtual application process, or other information about a virtual machine based on the virtual machine memory map. In some embodiments, the exposure of information about operations and virtual application processes occurring within the virtual machine can be provided through introspection via the hypervisor such that the exposure of information related to the VM (e.g., identification of any virtual applications, virtual application processes, virtual sockets, or any other information associated with the virtual machine) can occur without the hypervisor (and/or without the hypervisor firewall application) possessing and/or using access credentials associated with the virtual machine, and therefore does not access the virtual machine using the virtual port (and/or does not make a request to the virtual machine via the virtual port) to identify the virtual application and/or virtual application process associated with the port indicated in the communication request. Thus, the identity of a virtual application and/or a virtual application process corresponding to the virtual port can be exposed without the hypervisor firewall having control of any virtual application executing within the virtual machine and without having direct visibility into the virtual machine, such as by way of querying the virtual machine through a virtual port. The hypervisor firewall can build and use a virtual machine memory map so as to force exposure and identify the virtual application and/or virtual application process associated with the virtual port. Once the virtual application and/or virtual application process is identified, the hypervisor firewall can determine whether the inbound/outbound communication requests are authorized to be sent to and/or received by one or more virtual applications (and/or virtual application processes of the virtual application) executing on the virtual machine using the virtual port and the virtual socket that either sent the communication request and/or is targeted to receive the communication request. Thus, the hypervisor firewall can monitor and provide network firewall security for multiple instances of virtual machines despite each of the virtual machines not trusting each other and/or not having separate instances of a personal network firewall agent executing within each virtual machine. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for agentless personal network firewall security in virtualized datacenters will be described, according to an illustrative embodiment. The operating environment 100 shown in FIG. 1 includes a communications network ("network") 102 that is communicatively coupled to an unauthorized computing system 103 and a virtualized datacenter ("datacenter") 104. Briefly, it should be understood that the network 102 can include almost any type of computer networks as well as communications networks. The network 102 can be hosted, in part or in whole, by a communications service provider. The network 102 can include one or more of a radio access network, an evolved packet core network, a core network, an IP-based network, a transport network, an optical transport network, a circuit switched network, a mobile Wide Area Network, a combination thereof, or the like. In some embodiments, the datacenter 104 can be associated with at least a portion of the network 102, such as the portion which is operated by the communications service provider. The network 102 can host and/or be in communication with the datacenter 104 that can host one or more instances of virtualized and/or non-virtualized network services. For example, in some embodiments, the datacenter 104 can provide communication services, compute services, storage services, routing services, switching services, relay services, and/or other virtualized or non-virtualized network service. It should be understood that the term "service" should be construed as one or more executing applications that can provide a set of communication and/or network functions on behalf of the datacenter 104 and/or the network 102, and therefore the term "service" is not used, and should not be construed, to invoke any abstract idea or judicial exception. The network services can be used by a service provider, by third parties, and/or by customers via user equipment, servers, and/or other virtualized and/or non-virtualized computing systems. Further discussion of embodiments of the network 102 is provided with respect to FIG. 6. It should be understood that the examples provided are for illustration purposes only, and therefore should not be construed as limiting in any way.

In some embodiments, the operating environment 100 can include one or more instances of the unauthorized computing system 103. The unauthorized computing system 103 refers to any network device that is not associated with the datacenter 104 and attempts to send and/or receive communications from one or more virtual machines within the datacenter 104 without the permission of the datacenter 104. Embodiments of the unauthorized computing system 103 can include, but should not be limited to, a user equipment, a mobile communications device, a server, a desktop computer, a laptop computer, a tablet, a network access point, a switch, or other computing systems that can send and/or receive communications with the datacenter 104. It is understood that zero, one, or more than one instances of the unauthorized computing system 103 can be present within various embodiments of the operating environment 100. Further discussion of an embodiment of the host devices 106 is provided below with respect to FIG. 4.

In various embodiments, the datacenter 104 can include one or more host devices 106 that provide physical hardware computing infrastructure that can be selected and/or activated from an available inventory of processing resources and memory resources, such as processors 108 and memory storage devices ("memory") 110. The processors 108 can include one or more hardware components that perform computations to process data, and/or to execute computer-executable instructions of one or more application programs, operating systems, and/or other software, to provide, at least in part, any services or composition of services described herein. For example, the processors 108 can include one or more central processing units ("CPUs") configured with one or more processing cores, one or more graphics processing unit ("GPU") configured to accelerate operations performed by one or more CPUs, and/or one or more systems on a chip ("SOC") to perform computations to process data, and/or to execute computer-executable instructions of one or more application programs, operating systems, and/or other software that may or may not include instructions particular to graphics and/or communications computations. Further discussion of embodiments of the processor 108 as a processing unit and/or compute resources can be found with respect to FIG. 4 and FIG. 7. In various embodiments, the memory 110 can include one or more hardware components that perform storage operations, including temporary or permanent storage operations. In some embodiments, the memory 110 can include volatile and/or non-volatile memory implemented in any method or technology for storage of information such as computer-readable instructions, data structures, program modules, or other data disclosed herein. It is understood that, use of the term "memory" (or variations thereof, such as but not limited to virtual memory) in the claims does not include, and shall not be construed to include, a wave or a signal per se and/or communication media.

In various embodiments, the host devices 106 can conform to various industry standards and protocols which are known to one of ordinary skill. The host devices 106 can include one or more network interfaces (not shown) that can communicatively couple elements within the datacenter 104 and/or outside of the datacenter 104, such as to the network 102. In some embodiments, the host devices 106 can include one or more server clusters that can (re)allocate and (re)distribute processing and/or memory resources amongst one or more physical and/or virtual machines within the datacenter 104. Further discussion of an embodiment of the host devices 106 can be found below with respect to FIG. 5. It is understood that the examples provided are for illustration purposes only, and therefore should not be construed as limiting in any way.

In various embodiments, the host devices 106 can support one or more instances of an operating system 112. In an embodiment, the operating system 112 illustrated in FIG. 1 corresponds with an operating system from the LINUX family of operating systems built around a LINUX kernel, however this may not be the case for every embodiment. In some embodiments, the operating system 112 can include, but is not limited to, one or more instances from members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like. It should be understood that the examples provided are for illustration purposes only, and therefore should not be construed as limiting in any way.

In various embodiments, the host devices 106 and the operating system 112 can support a hypervisor 114 that provides virtualized functions, such as the instantiation, execution, and support of one or more virtual machines that can provide one or more virtual services for the datacenter 104. In an embodiment, the hypervisor 114 can be configured as a "type-1" native or bare-metal hypervisor that can control and/or run directly on the hardware resources of the host device 106 and can host virtual machines without an operating system operating or otherwise disposed between the host devices 106 and the hypervisor 114. In some embodiments, the hypervisor 114 can be configured as a "type-2" hosted hypervisor that executes on the operating system 112 supported by the host devices 106, however this may not be case in every embodiment. In some embodiments, the hypervisor 114 can be configured to operate with at least some aspects of both a type-1 and type-2 hypervisor, such as when the hypervisor 114 is configured as a kernel-based virtual machine ("kernel hypervisor"). For example, in some embodiments where the hypervisor 114 operates as a kernel hypervisor with a LINUX kernel due to the operating system 112 being associated with a LINUX operating system, the hypervisor 114 can effectively convert the operating system 112 into a type-1 hypervisor that functions as a bare-metal hypervisor, while also still allowing for other applications to use the operating system 112, such as a hypervisor firewall application ("HVFA") 120. It should be understood that the examples provided are for illustration purposes only, and therefore should not be construed as limiting in any way.

In various embodiments, the datacenter 104 can support one or more instances of a virtual machine ("VM"), such as a VM A 130, a VM B 140, and a VM N 150, where the phrase "VM N" refers to any number of virtual machines that can vary dependent on the particular configuration and/or computing requirements of the datacenter 104. Therefore, although three instances of a VM are illustrated in FIG. 1, it is understood that various embodiments can have a different number of VMs present within the datacenter 104. The VMs 130, 140, and 150 can support one or more network services that are virtualized and provide one or more communication, storage, and/or processing capabilities for the datacenter 104. For example, a VM can perform operations associated with one or more of virtual switches, virtual routers, virtualized routing functions, a virtual tap, a virtual network interface controller, a virtual storage device, a virtual server, or other virtual network functions. In some embodiments, each of the VMs 130, 140, and 150 may be siloed from each other such that each VM operates independent of the other. It should be understood that the examples provided are for illustration purposes only, and therefore should not be construed as limiting in any way.

In various embodiments, each VM (e.g., the VM A 130, the VM B 140, and the VM N 150) can include components that extend the functionality of the underlying physical computing hardware (e.g., the processors 108 and the memory 110) from the host devices 106 such that virtual computing resources can be scaled based on the needs of a particular virtual machine. Each VM (e.g., the VM A 130, the VM B 140, and the VM N 150) can include virtual processing resources, such as a virtual processor ("vCPU"), and virtual memory resources, such as a virtual memory ("vMem"). For example, the VM A 130 can include a vCPU 132 and a vMem 136, and the VM B 140 can include a vCPU 142 and a vMem 144. Each of the virtual processing resources (e.g., the vCPUs 132, 142) can be allocated a specific amount of processing resources from the host devices 106, such as one or more cores from the processors 108 of the host device 106. Each virtual memory resource (e.g., the vMems 136, 144) can be assigned a portion of the memory 110 of the host devices 106, where the virtual memory resources can receive one or more virtual memory addresses that can be associated or otherwise linked to one or more physical memory addresses of the memory 110. Each VM (e.g., the VM A 130, the VM B 140, and the VM N 150) can include a virtual operating system ("vOS"), such as a vOS 137 of the VM A 130 and a vOS 145 of the VM B 140, within a user space of the VM so as to support the execution of one or more virtual applications ("vApp"), such as a vApp 138 of the VM A 130 and a vApp 146 of the VM B 140. In some embodiments, a vOS can include any of the operating systems discussed above with respect to the operating system 112. Each vApp can execute one or more virtual application processes ("vApp process") (e.g., a vApp process 139 of the vApp 138 and a vApp process 147 of the vApp 146) that can correspond with one or more modules and/or instructions of the vApp. Each vApp process (e.g., the vApp processes 139, 147) can consume at least a portion of virtual processing and virtual memory resources allocated to the VM, such as processing resources of the vCPUs 132, 142 and the memory resources of the vMems 136, 144. In various embodiments, each vApp process can be associated with an identifier ("vApp process ID"), such as a vApp process ID 139A associated with the vApp process 139 and a vApp process ID 147A associated with the vApp process 147. Each vApp process ID can identify the associated vApp process and/or vApp, such as the vApp process ID 139A identifying the vApp process 139 and/or the vApp 138, and the vApp process ID 147A identifying the vApp process 147 and/or the vApp 146. Although one instance of the vApps 138, 146 and the vApp processes 139, 147 are shown in FIG. 1, it is understood that in various embodiments, each VM can include two or more instances of a vApp, and each vApp can correspond with two or more instances of a vApp process. It should be understood that the examples provided are for illustration purposes only, and therefore should not be construed as limiting in any way.

In various embodiments, the hypervisor 114 can convey and route messages to and/or from a VM via at least one virtual port ("vPort") that is associated with at least one virtual socket ("vSocket"). For example, the VM A 130 can include a vPort 131 and a vSocket 134, and the VM B 140 can include a vPort 141 and a vSocket 143. A vPort (e.g., the vPorts 131, 141) can provide a communication interface between a VM (e.g., the VM A 130 and/or the VM B 140) and the hypervisor 114. A vSocket can operate as a virtual application programing interface ("vAPI") that can bind a vApp to a vPort so as to allow for various communications to be sent and/or received via one or more vPorts. For example, in response to the hypervisor 114 receiving a message that is directed to a VM (e.g., inbound for any of the VM A 130, the VM B 140, and/or the VM N 150), the hypervisor 114 can determine which vPort is the destination of the message and can forward the message to the vPort. If a vPort is not active and thus not associated with a particular vApp, then the vApp and vApp processes will not be able to send and/or receive messages via the vPort. Thus, if the vPort is not active for a particular vApp and/or vApp process, then attempts by the hypervisor 114 to deliver the message via the inactive vPort will be rejected, and the hypervisor 114 can discard the rejected message and can generate an error message that can be returned to the sender (e.g., another VM, the unauthorized computing system 103, or another computing device that generated the message directed to the destination vPort). A vPort is active when a vApp has created a vSocket and binds the vSocket to the vPort so as to allow the vApp to actively listen and use the vPort. Put differently, a vApp will listen for communications from a vPort that is active and associated with the vApp and/or one or more vApp processes. To activate the vPort for use by one or more vApp processes of the vApp, a vApp (e.g., the vApp 138 and/or the vApp 146) can create one or more vSockets (e.g., the vSockets 134, 143) that attach to a vPort. For example, the vApp 138 can create the vSocket 134 to attach to and activate the vPort 131. Similarly, the vApp 146 can create the vSocket 143 to attach to and activate the vPort 141. Once a vSocket is created and associated with a vPort, one or more messages can be sent to and/or from the vApp via the vPort. Although a vPort is active, the vPort itself may not directly identify which vSocket, vApp and/or vApp processes are associated with the vPort. It is understood that, in some embodiments, a VM may have a plurality of vApp's and a vPort may be activated by different vApps at different points in time. As such, in some embodiments, the association between a vPort and a vApp can be dynamic based on whether the vApp has created a vSocket so as to activate a vPort and allow for communications to occur.

Each vPort (e.g., the vPorts 131, 141) and vSocket (e.g., the vSockets 134, 143) can correspond with a protocol type, such as but not limited to, a Transmission Control Protocol ("TCP"), a user Datagram Protocol ("UDP"), a combination thereof, or other protocol. It is understood that each vPort can correspond with a port identifier, such as a port number, and each vSocket can correspond with socket identifier, where each of the port identifier and the socket identifier can depend on the protocol type, as is understood by one of ordinary skill in the technology. In some embodiments, communication over multiple protocol types (e.g., TCP and UDP) can occur over the same vPort and/or vSocket. Although only one vPort is shown for each VM as illustrated in FIG. 1, it is understood that in various embodiments, each VM can include a plurality of vPorts and vSockets that can be created, activated, and/or deactivated as needed based on the particular activities and requirements of a vApp within each VM. It should be understood that the examples provided are for illustration purposes only, and therefore should not be construed as limiting in any way.

In various embodiments, the hypervisor 114 may not have administrative credentials (also referred to as "access credentials") for a particular VM to gain control over the activities of the vApp within the VM. Administrative (or access) credentials can include a certificate, password, key, token, hierarchical status, and/or any other information that can be provided to the VM so as to instruct the VM to reveal information about any virtual socket, virtual application and/or virtual application process executing therein and associated with virtual port indicated by a communication request. Therefore, a VM may ignore and/or deny requests from the hypervisor 114 (and/or a hypervisor firewall application) to identify which vApps, vApp processes, and/or vSockets are executing and may not identify vApps, vApp processes, and vSockets that are assigned and associated with a particular vPort. The hypervisor 114 can determine whether a vPort is active or inactive, but may not receive information related to the vPort by making requests to the VM. A vPort (e.g., the vPorts 131, 141) is considered active when it is associated and bound to a vSocket (e.g., the vSockets 134, 143) that is being listened to and used by an executing vApp and one or more vApp processes thereof. A vPort (e.g., the vPorts 131, 141) is considered inactive when it is not bound or otherwise not associated with a vSocket that was created by a vApp because the vApp and vApp process are not executing or otherwise using the vPort. In some embodiments, a VM can send a vPort status message to the hypervisor 114 to inform the hypervisor 114 whether a vPort is active, however the status message does not include any other information about the VM. In some embodiments, the hypervisor 114 can obtain information used for making a decision as to how to handle a communication by viewing, such as through introspection, internal memory associated with the virtual machine.

Embodiments of the present disclosure can provide a hypervisor firewall application ("HVFA"), such as the HVFA 120, that can communicate with the hypervisor 114 to monitor network traffic that is inbound and/or outbound from one or more VMs (e.g., any of the VM A 130, the VM B 140, and the VM N 150) of the datacenter 104. In some embodiments, the HVFA 120 can be supported by the operating system 112 and one or more processors 108 and one or more memory 110 of the host devices 106. In various embodiments, the HVFA 120 can communicate with the hypervisor 114 via a hypervisor application programming interface. In some embodiments, the HVFA 120 can be included as a software program of the hypervisor 114. The HVFA 120 and the hypervisor 114 can have access to and monitor any and/or all communication messages going to and coming from any VM within the datacenter 104. An example of a communication message is a virtual datacenter communication request ("vDCCR") 152. Each vDCCR 152 can have a source and a destination. For example, in some embodiments, the vDCCR 152 can be generated by one of the VMs within the datacenter 104, such as being generated by the vApp 146 of the VM B 140. In this example, if the VM B 140 sends the vDCCR 152 to the VM A 130 (e.g., to the vApp process 139 of the vApp 138), then the VM B 140 would be considered to be the source and the VM A 130 would be considered to be the destination. In this example, the vDCCR 152 would be considered an outgoing or outbound communication request from the VM B 140, and also would be considered an inbound or incoming communication request for the VM A 130. As illustrated in FIG. 1, the vDCCR 152 is shown as the inbound communication request for the VM A 130. It is understood that the label of "source," "origin," "destination," and/or "target" can be applied to a VM and one or more components thereof (e.g., a vApp and/or a vApp process). For example, the vPort 141 of the VM B 140 can be considered the source port for the vDCCR 152 and the vPort 131 of the VM A 130 can be considered the destination port for the vDCCR 152.

In various embodiments, the vDCCR 152 can include a set of endpoint message criteria 153. The endpoint message criteria 153 can correspond with information about the communication message and at least some information about the destination VM. The endpoint message criteria 153 can include, but should not be limited to, one or more of a source internet protocol ("IP") address 155, a source port 156, a destination port 157, a destination IP address 158, and a protocol type 159. For example, in an embodiment where the VM B 140 sends the vDCCR 152 to the VM A 130, the source IP address 155 would correspond with an IP address assigned to the VM B 140, the source port 156 would correspond with the vPort 141 of the VM B 140, the destination IP address 158 would correspond with an IP assigned to the VM A 130, the destination port 157 would correspond with the vPort 131, and a protocol type 159 can correspond with one or more types of protocols that can be handled by the sending and/or receiving VM, such as but not limited to TCP and/or UDP. In some embodiments, the endpoint message criteria 153 and any other contents of the vDCCR 152 may not include, and therefore lacks, an identity of a vApp and/or of a vApp process of a vApp that executes on the destination VM. For example, in some embodiments, the vDCCR 152 does not include the vApp process ID 139A that identifies one or more of the vApp process 139 and the vApp 138A that was used to activate the vSocket 134 thereby binding or otherwise associating the vApp 138 and the vApp process 139 to the vPort 131 (which in various embodiments can be a source port and/or destination port depending on whether the vPort 131 is being used to send the vDCCR 152 or receive the vDCCR 152, respectively). As such, the HVFA 120 and the hypervisor 114 may not find the identification of a vApp within the endpoint message criteria 153 or within any other contents of the vDCCR 152. In an embodiment, the endpoint message criteria 153 of the vDCCR 152 may include a concealed identifier 154 that conceals, encrypts, or otherwise obscures an identity of a vApp and/or vApp process corresponding to the destination port of the vDCCR 152. For example, in an embodiment the concealed identifier 154 can be configured as the vApp process ID 139A in an encrypted format such that the vApp process ID 139A and identification of a vApp cannot be determined from the concealed identifier 154. By this, the HVFA 120 and the hypervisor 114 may not be able to directly identify the vApp process ID 139A corresponding to the vApp 138 and/or vApp process 139 by relying solely on the concealed identifier 154. It should be understood that the examples provided are for illustration purposes only, and therefore should not be construed as limiting in any way. In some embodiments, for an outbound communication (e.g., an instance of the vDCCR 152), the HVFA 120 may add additional information about the outbound communication to the endpoint message criteria 153. In some embodiments, the HVFA 120 can identify and/or retrieve data through introspection (e.g., based on use of the process address space map 116), where the data can include, but should not be limited to a virtual application process name and/or identification, one or more virtual application process permissions, an identity of loaded modules in a virtual application process, or the like. It is understood that the examples provided are for illustration purposes only and therefore should not be limiting in any way because other information may be identified and retrieved. In some embodiments, the HVFA 120 can initiate and query an external source (i.e., external to the host device 106), such as but not limited to an orchestrator function executing on the network 102, so as to determine which pieces and/or portions of additional data that can and/or should be incorporated in an instance of the access parameters 122 and/or the endpoint message criteria 153. Similarly, for an inbound communication (e.g., an instance of the vDCCR 152), the data that is sent from a source VM can be checked with authorization settings (e.g., user permissions) of the destination VM. For example, if the inbound communication should be allowed to be directed only to a specific virtual application process that is running with user permissions on the destination VM, then the HVFA 120 can check and verify that this specific virtual application process corresponds to and executes on the destination VM through introspection (e.g., use of the process address space map 116 that can be used to expose a virtual application process identity), and only once the HVFA 120 determines that the certain virtual application process is present and/or executing on the destination VM (and determines that the user permissions are met) will the inbound communication be allowed to proceed to the destination VM (e.g., via the corresponding destination virtual port). It is understood that, in various embodiments, a communication (e.g., an instance of the vDCCR 152) may be verified and/or analyzed by an HVFA (e.g., an instance of the HVFA 120) once per connection point, such as once at the point of sending the communication (e.g., when a source VM establishes connection with an HVFA to send the communication to a destination VM) and once at the point of receiving the communication (e.g., when another HVFA detects the communication that is directed toward a destination VM). As such, multiple instances of the HVFA 120 can execute in the operating environment 100, such as a system in which one instance of the HVFA 120 can handle a communication (e.g., an instance of the vDCCR 152) being sent from a source VM and another instance of the HVFA 120 that can handle the communication being received and directed to a destination VM. By this, the same communication may be checked and analyzed two or more times depending on the number of intended destination virtual machines. It should be understood that the examples provided are for illustration purposes only, and therefore should not be construed as limiting in any way.

In various embodiments, when a vDCCR 152 is provided to the destination port 157 indicated by the endpoint message criteria 153 (e.g., the vPort 131 of the VM A 130), the vSocket corresponding to the destination port 157 (e.g., the vSocket 134 corresponding to the vPort 131) can convey the vDCCR 152 (and/or any contents therein) to a vApp (e.g., the vApp 138) and/or one or more vApp processes (e.g., the vApp process 139). In some embodiments, if a destination port 157 is determined by the HVFA 120 and/or the hypervisor 114 to be inactive (i.e., a vSocket has not been assigned to the particular vPort that is designated as the destination port 157) and/or non-compliant with one or more access parameters (e.g., an instance of access parameters 122 discussed below), then the HVFA 120 and/or the hypervisor 114 can discard, drop, return, reroute, quarantine, or otherwise not deliver the vDCCR 152 (or a portion thereof) to the VM for which the vDCCR 152 was targeted. It should be understood that the examples provided are for illustration purposes only, and therefore should not be construed as limiting in any way.

In various embodiments, a message that is inbound and/or outbound to and/or from a VM can be compared against the access parameters 122. In some embodiments, the HVFA 120 can access, create, configure, and/or manage the access parameters 122 for communications that are inbound to and/or outbound from one or more VM. The access parameters 122 can be configured as a set of access rules by which the HVFA 120 can use for comparison to assist in determining whether a VM, a vApp, and/or vApp process is allowed and authorized to send and/or receive the inbound and/or outbound message. For example, in various embodiments, the access parameters 122 can include a network communication whitelist 124, an authorized protocol list 126, and an authorized port list 128. The network communication whitelist 124 can include a list of identifiers corresponding to the vApps and/or vApp processes that are allowed to send and/or receive messages. For example, the network communication whitelist 124 can include the vApp process ID 139A corresponding to the vApp process 139 and the vApp 138 so as to indicate that the vApp process and the vApp is allowed to send and/or receive messages (e.g., the vDCCR 152). In some embodiments, the network communication whitelist 124 can include a list of source IP addresses in which communication messages (e.g., the vDCCR 152) are allowed to be sent from and/or destination IP addresses in which communication messages (e.g., the vDCCR 152) are allowed to be directed to. The authorized protocol list 126 can identify whether a vApp and/or vApp process is authorized to use a source and/or destination port (e.g., the vPort 131) corresponding to a particular protocol type, such as TCP and/or UDP. For example, if an inbound and/or outbound message is coming from and/or going to the vApp 138, the authorized protocol list 126 may indicate which protocol type the vApp 138 and/or the vApp process 139 is allowed to use, such as TCP, UDP, and/or a combination thereof. The authorized port list 128 can include identifier(s) (e.g., a port number) corresponding with one or more vPort that a vApp and/or vApp process is allowed to use to send and/or receive inbound and/or outbound messages (e.g., the vDCCR 152). For example, the authorized port list 128 can identify the vPort 131 on the VM A 130 and indicate that the vPort 131 is only allowed to be used by the vApp 138 and any vApp processes thereof. It should be understood that the examples provided are for illustration purposes only, and therefore should not be construed as limiting in any way. In various embodiments, the HVFA 120 can maintain and/or update the access parameters 122 so as to add and/or remove VMs, vApps, vApp processes, protocol types, and vPorts from the access parameters 122 based on determination that a vApp has been installed and/or removed from a VM and/or other configurations of the datacenter 104. By this, when more VMs are brought online and/or deactivated via the hypervisor 114, the access parameters 122 can be adjusted and updated accordingly so as to ensure that the HVFA 120 can maintain control of inbound and outbound messages to and from specific vApps via authorized vPorts. It should be understood that the examples provided and discussed herein are for illustration purposes only, and therefore should not be construed as limiting in any way. As such, embodiments of the present disclosure can retrieve various types of information to perform operations discussed herein, such as create rules and employ information for handling communications, and therefore the types of data discussed herein (e.g., a source IP address, a source port identifier, a destination IP address, a destination port identifier, a protocol type, etc.) are examples used for illustration purposes only, and should not be considered limiting as to the scope of possible information that can be retrieved and/or used for various embodiments of the present disclosure.

In some embodiments, the HVFA 120 may not directly know which vApp and/or vApp process a message is directed to within a VM. Because the access parameters 122 can indicate whether a vPort is authorized to send and/or receive communications for certain vApps and/or vApp processes, the HVFA 120 may seek to determine which vApp and/or vApp process the message is directed to without the message (e.g., the vDCCR 152) indicating or otherwise identifying the vApp and/or vApp process. To accomplish this, the HVFA 120 can translate one or more virtual addresses from a VM into physical addresses corresponding to resources of the host devices 106, and then use information from the message (e.g., the vDCCR 152) to determine which vApp and/or vApp process corresponds with the vPort. For example, in some embodiments, the HVFA 120 can execute within and/or have access to a kernel within a kernel space of the operating system 112 for the host device 106. In some embodiments, the operating system 112 can correspond with a LINUX operating system which has a kernel space that corresponds with a LINUX kernel space. In some embodiments, the HVFA 120 and/or the hypervisor 114 can access, analyze, read, write, (re)configure, and/or otherwise perform operations pertaining to the kernel space. It is understood that the kernel space can provide information associated with one or more of processor management, memory management, a network stack, a virtual file system, device drivers, architecture code, a combination thereof, or the like.

In some embodiments, the hypervisor 114 and/or the HVFA 120 can access a process address space map 116 that reveals associations and links between the virtual resources supported by the hypervisor 114 and the physical resources supported and provided by the host devices 106. The process address space map 116 can provide a queryable data structure. The process address space map 116 can include a plurality of pointers that point from an identification of a vPort to a process address space that, in turn, corresponds with a virtual address of a virtual machine page direction ("VMPD") 162 which is returned to the hypervisor 114 and the HVFA 120. For example, the HVFA 120 can analyze and inspect the vDCCR 152 to identify a vPort that the vDCCR 152 is coming from and/or going to (e.g., a source port 156 and/or a destination port 157 from the vDCCR 152 that, in some embodiments, can correspond with coming from the vPort 141 and going to the vPort 131). The HVFA 120 can access the process address space map 116 using the identifier of the vPort (e.g., with the vPort 131) and in return, the process address space map 116 can provide an identifier corresponding to the VMPD 162. It should be understood that the examples provided are for illustration purposes only, and therefore should not be construed as limiting in any way.

In various embodiments, the HVFA 120 can build a virtual machine memory map ("VMMM") 160. In some embodiments, the HVFA 120 can build multiple instances of the VMMM 160, where each VMMM 160 can correspond with a different vPort. It should be understood that the examples provided are for illustration purposes only, and therefore should not be construed as limiting in any way. In some embodiments, the HVFA 120 can use the identification of the VMPD 162 to analyze the kernel space of the host devices 106, where upon analysis of the VMPD 162 within the kernel space, the VMPD 162 can identify a virtual memory address 164 corresponding with a virtual memory page table ("VMPT") 166. The HVFA 120 can then inspect the VMPT 166 so as to reconstruct a kernel socket data structure 168 corresponding to the VM that is using the vPort indicated by the vDCCR 152. The VMPT 166 can point to the kernel socket data structure 168 that can identify any virtual sockets that are being used by the VM corresponding with the vPort indicated by the vDCCR 152. For example, in some embodiments, the kernel socket data structure 168 can indicate that the vSocket 134 is currently attached to the vPort 131 (which can be identified as the destination port 157 from the vDCCR 152) and the vSocket 134 is currently being used by a vApp process of a vApp. The kernel socket data structure 168 can be associated with the processor resources and/or memory resources for vApps within a VM that are provided and/or otherwise hosted by the host devices 106. The kernel socket data structure 168 can include a socket structure 170 that can be configured as one or more fields within the kernel socket data structure 168, where the socket structure 170 can include one or more identifiers of vApp processes of a vApp that is using the vSocket corresponding to the vPort. For example, in an embodiment, the kernel socket data structure 168 can have a socket structure 170 which indicates that the vApp process ID 139A is associated with use of the vSocket 134 that is attached, associated, and otherwise bound to the vPort 131 (which can be identified in the vDCCR 152 as at least one of the destination port 157 or the source port 156). Therefore, based on the VMMM 160, the HVFA 120 can force exposure of the vApp process ID 139A to identify the vApp process 139 and the vApp 138 that is currently using the vPort 131 via the vSocket 134. Therefore, despite the hypervisor 114 not having direct visibility into which vApp and vApp process is associated with the vPort identified in the vDCCR 152, the HVFA 120 can build and determine which vApp, vApp process, and vSocket is the source and/or target recipient behind the vPort. By this, the HVFA 120 can provide monitoring and administer a network firewall security for a plurality of VMs without implementing at least one personal network security agent within each VM hosted by the hypervisor 114.

In various embodiments, once the HVFA 120 identifies the vApp process and/or the vApp that is associated with the source and/or destination port (e.g., the vApp 138 and the vApp process 139 associated with the vSocket 134 and the vPort 131), the HVFA 120 can pull (i.e., retrieve and/or access) the access parameters 122 to determine whether the inbound and/or outbound communication request (e.g., the vDCCR 152) is permitted to access the vApp process (e.g., the vApp process 139). In some embodiments, when a VM (e.g., the VM B 140) supported by the hypervisor 114 attempts to establish an outbound connection (e.g., attempting to send the vDCCR 152 using the vPort 141), the HVFA 120 can intercept the communication request (e.g., the vDCCR 152) and inspect packets included therein (i.e., the content within the message). For example, the HVFA 120 can inspect the vDCCR 152 and identify one or more of the source IP address 155 (e.g., the IP address that may in some embodiments correspond with the IP address of the VM B 140), the source port (e.g., the vPort 141 of the VM B 140), the destination IP address 158 (e.g., the IP address corresponding with the VM A 130), the destination port (e.g., the vPort 131 of the VM A 130), and/or the protocol type 159 of the message (e.g., TCP and/or UDP). The HVFA 120 also can perform operations discussed herein to identify the source vApp process that was used to establish the connection and send the vDCCR 152 (e.g., building and using the VMMM 160 to force exposure of the vApp process ID 147A to reveal that the vApp process 147 and vApp 146 was used to send the vDCCR 152, according to an embodiment). The HVFA 120 also can perform operations discussed herein to identify the destination vApp process that is the target of the message and associated with the destination vSocket and vPort (e.g., building and using the VMMM 160 to force exposure of the vApp process ID 139A to reveal that the vApp process 139 of the vApp 138 of the VM A 130 is the target destination that is listening behind the vSocket 134 to the vPort 131). It is understood that the vDCCR 152 may not identify the source vApp and source vApp process that sent the vDCCR 152 (e.g., the vApp process 147 of the vApp 146 of the VM B 140) and also may not identify the destination vApp and destination vApp process that are the intended targets listening behind the destination port (e.g., the vApp process 139 of the vApp 138 listening and associated with the vSocket 134 and the vPort 131).

In various embodiments, once the HVFA 120 has determined the destination vApp process of the destination vApp (e.g., the vApp process 139 of the vApp 138 listening and associated with the vSocket 134 and the vPort 131) associated with the vDCCR 152, the HVFA 120 can determine whether the vApp process ID 139A and/or an IP address associated with the VM A 130 is within the network communication whitelist 124, whether the protocol type 159 of the vDCCR 152 is permitted for use with the vApp 138, vApp process 139, and the vPort 131, and whether the vApp 138 and the vApp process 139 are authorized to use the vPort 131. In an embodiment, the HVFA 120 may determine that the inbound and/or outbound communication (e.g., the vDCCR 152) is permitted to access the vApp 138 and the vApp process 139 in response to determining that the vApp process ID 139A and the vDCCR 152 conform to the access parameters 122 corresponding to the VM A 130. In response to determining that the inbound communication request (e.g., the vDCCR 152) is permitted to access the vApp process 139, the HVFA 120 can route the vDCCR 152 to the vPort 131 for execution by the vApp process 139 of the vApp 138 of the VM A 130. In another embodiment, the HVFA 120 may determine that the inbound and/or outbound communication (e.g., the vDCCR 152) is not permitted to access the vApp 138 and the vApp process 139 in response to determining that the vApp process ID 139A and the vDCCR 152 do not conform to the requirements of the access parameters 122 (e.g., the vApp process 139 and vApp 138 not being on the network communication whitelist 124, the protocol type 159 not being approved for the vApp 138, and/or the vPort 131 not being approved to send and/or receive messages to the source IP address and/or destination IP address). In response to the HVFA 120 determining that the inbound communication request (e.g., the vDCCR 152) is not permitted to access the vApp process 139, the HVFA 120 can prevent the inbound communication request (e.g., the vDCCR 152) from reaching the vPort 131. For example, the HVFA 120 can drop, discard, erase, and/or reroute the vDCCR 152 such that it does not reach the vApp 138 and vApp process 139 of the VM A 130 via the vPort 131 and the vSocket 134.

It is understood that the HVFA 120 can handle and analyze more than one instance of an inbound communication request and/or outbound communication request (e.g., the vDCCR 152) from any of the VMs supported by the hypervisor 114 (e.g., any of the VM A 130, the VM B 140, and the VM N 150). In an embodiment, the vDCCR 152 has been discussed in the examples above as an inbound communication request that is targeted for the VM A 130 via the vPort 131, however this may not be the case in all embodiments. In some embodiments, an instance of the vDCCR 152 can correspond with an outbound or outgoing communication request from the VM B 140, where the HVFA 120 can analyze and perform operations discussed herein to determine which vApp and vApp process sent the outbound communication request via the vPort 141 and whether that vApp and vApp process are allowed to send such messages to the intended target (e.g., another VM within the datacenter 104, the unauthorized computing system 103, or other network device). By this, the HVFA 120 can ensure that the VM B 140 (or any other VM that is sending the outbound communication request) has not become infected with a virus or otherwise become compromised such that a vApp within the VM (e.g., the vApp 146 within the VM B 140) is attempting to communicate sensitive and/or proprietary information to an unauthorized party (e.g., the unauthorized computing system 103).

In various embodiments, the network administrator of the datacenter 104 may no longer approve of the use of a personal network firewall agent within a VM and thus may seek to ensure that personal network firewall agents are no longer in operation on VMs within the datacenter 104. In some embodiments, the HVFA 120 may confirm that one or more instances of a VM (e.g., the VM A 130) does not have an instance of a personal network firewall agent running and executing locally within the VM, where the personal network firewall agent would conventionally be implemented to monitor inbound and outgoing communications solely for that one VM via a vPort (e.g., the vPort 131). In some embodiments, the HVFA 120 can query the hypervisor 114 to confirm that a personal network firewall agent is not associated with and/or presently executing on a VM (e.g., the VM B 140). In some embodiments, the HVFA 120 may send a test message to a vPort of the VM that, if a personal network firewall agent is present and executing locally, would not be accepted by the VM because the personal network firewall agent would reject or confiscate the message; however, if a personal network firewall agent is not present, then the test message may be accepted. The test message may be harmless (i.e., the test message does not include a script and/or process that could cause the VM to perform any operations), but the test message may appear to a personal network firewall agent to be a virus (i.e., not harmless) if in fact an instance of a personal network firewall agent is present and executing on the VM. For example, in an embodiment, a personal network firewall agent 148 may be installed and executing within the VM B 140, yet be unauthorized for use according to the HVFA 120. If the HVFA 120 sends a test message to the personal network firewall agent 148, then the test message may be quarantined and/or rejected by the personal network firewall agent 148 despite the test message not posing any harm to the VM B 140 (e.g., the test message not being executable by the VM B 140). If the test message is rejected by the personal network firewall agent 148, then the HVFA 120 has confirmed that a personal network firewall agent 148 is present and executing within the VM B 140 without authorization. The HVFA 120 can then take steps to remove or otherwise stop the personal network firewall agent 148 from executing within the VM B 140, such as by severing address pointers between virtual and physical processor and memory resources of the host device 106, which is discussed below. It is understood that determination of whether a personal network firewall agent is stored and/or executing on a VM, and removal (or disablement, etc.) of a personal network firewall agent, may occur prior to, during, and/or after a vApp and/or vApp process associated with the vPort has been identified. It should be understood that the examples provided are for illustration purposes only, and therefore should not be construed as limiting in any way.

In some embodiments, the hypervisor 114 may have an install record stored within the memory 110 that includes a list of any personal network firewall agents that have been and/or are currently stored within and capable of being executed on a VM supported by the hypervisor 114 (e.g., any of the VM A 130, the VM B 140, and/or the VM N 150). In an embodiment, if the hypervisor 114 and/or the HVFA 120 determine that the VM B 140 stores and/or is executing a personal network firewall agent 148, the HVFA 120 may seek to remove and/or stop the personal network firewall agent 148. In an embodiment, to ensure that the personal network firewall agent 148 does not act contrary to, or otherwise override, the HVFA 120, the HVFA 120 can instruct the hypervisor 114 to stop execution and/or remove the personal network firewall agent 148 within the corresponding VM (e.g., the VM B 140). In some embodiments, the HVFA 120 can use the process address space map 116 and the virtual machine memory map ("VMMM") 160 to identify a virtual memory address corresponding to the personal network firewall agent 148, and in response, the HVFA 120 can remove and sever virtual processing resources and/or virtual memory resources that have been available to the personal network firewall agent 148 (e.g., by instructing the hypervisor 114 not to fulfill requests by the personal network firewall agent 148 for processing resources and memory access resources provided by a VM and/or the host devices 106). It should be understood that the examples provided are for illustration purposes only, and therefore should not be construed as limiting in any way.

In some embodiments, the HVFA 120 can ensure and confirm that the VM that is the source and/or target (i.e., destination) of the communication request does not have a personal network firewall agent executing so as to improve processing efficiency by reducing the virtual and physical processor resource usage and memory resource usage within the datacenter 104. As such, the concepts and technologies discussed herein improve the functioning of particular computing machines by solving technical challenges that arise because of, and specifically within, the realm to network technology pertaining to virtualized datacenters. It is understood that the examples provided are for illustration purposes only, and therefore should not be construed as limiting in any way.

FIG. 1 illustrates instances of one network 102, one unauthorized computing system 103, one host device 106, one processor 108, one memory 110, one operating system 112, one hypervisor 114, one process address space map 116, one HVFA 120, one set of access parameters 122, one network communication whitelist 124, one authorized protocol list 126, one authorized port list 128, one VM A 130, one vPort 131, one vSocket 134, one vCPU 132, one vMem 136, one vOS 137, one vApp process ID 139A, one vApp process 139, one vApp 138, one VM B 140, one vPort 141, one vSocket 143, one vCPU 142, one vMem 144, one vOS 145, one personal network firewall agent 148, one vApp process ID 147A, one vApp process 147, one vApp 146, one VM N 150, one vDCCR 152, one endpoint message criteria 153, one concealed identifier 154, one source IP address 155, one source port 156, one destination port 157, one destination IP address 158, one protocol type 159, one VMMM 160, one VMPD 162, one virtual memory address 164, one VMPT 166, one kernel socket data structure 168, and one socket structure 170. It should be understood, however, that some implementations of the operating environment 100 can include zero, one, or more than one instance of these elements of the operating environment 100 shown in FIG. 1. As such, the illustrated embodiment of the operating environment 100 should be understood as being illustrative, and should not be construed as being limiting in any way.

Figure 2:
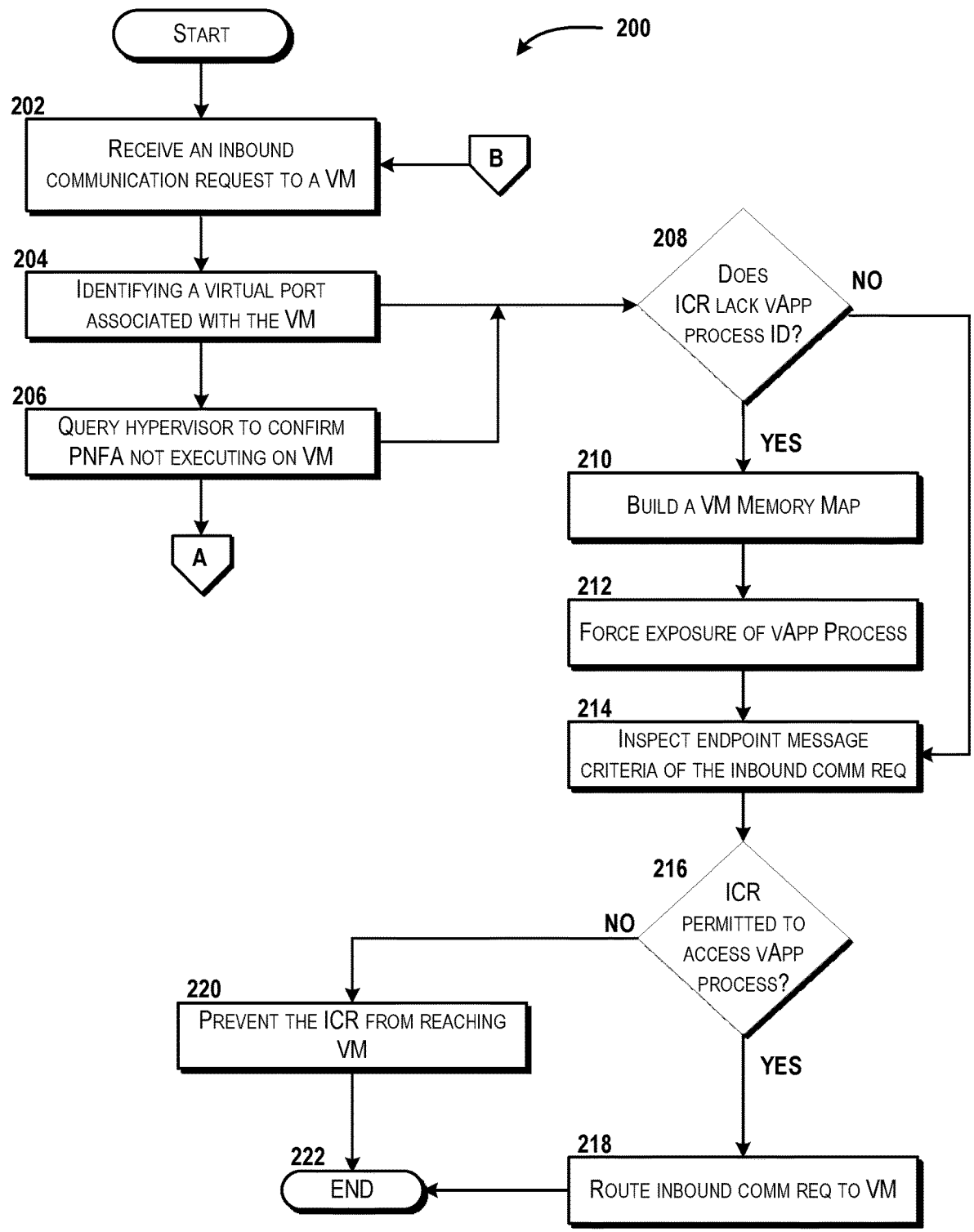
FIG. 2 is a flow diagram illustrating aspects of a method for agentless personal network firewall security in virtualized datacenters, according to an illustrative embodiment.
Figure 3:
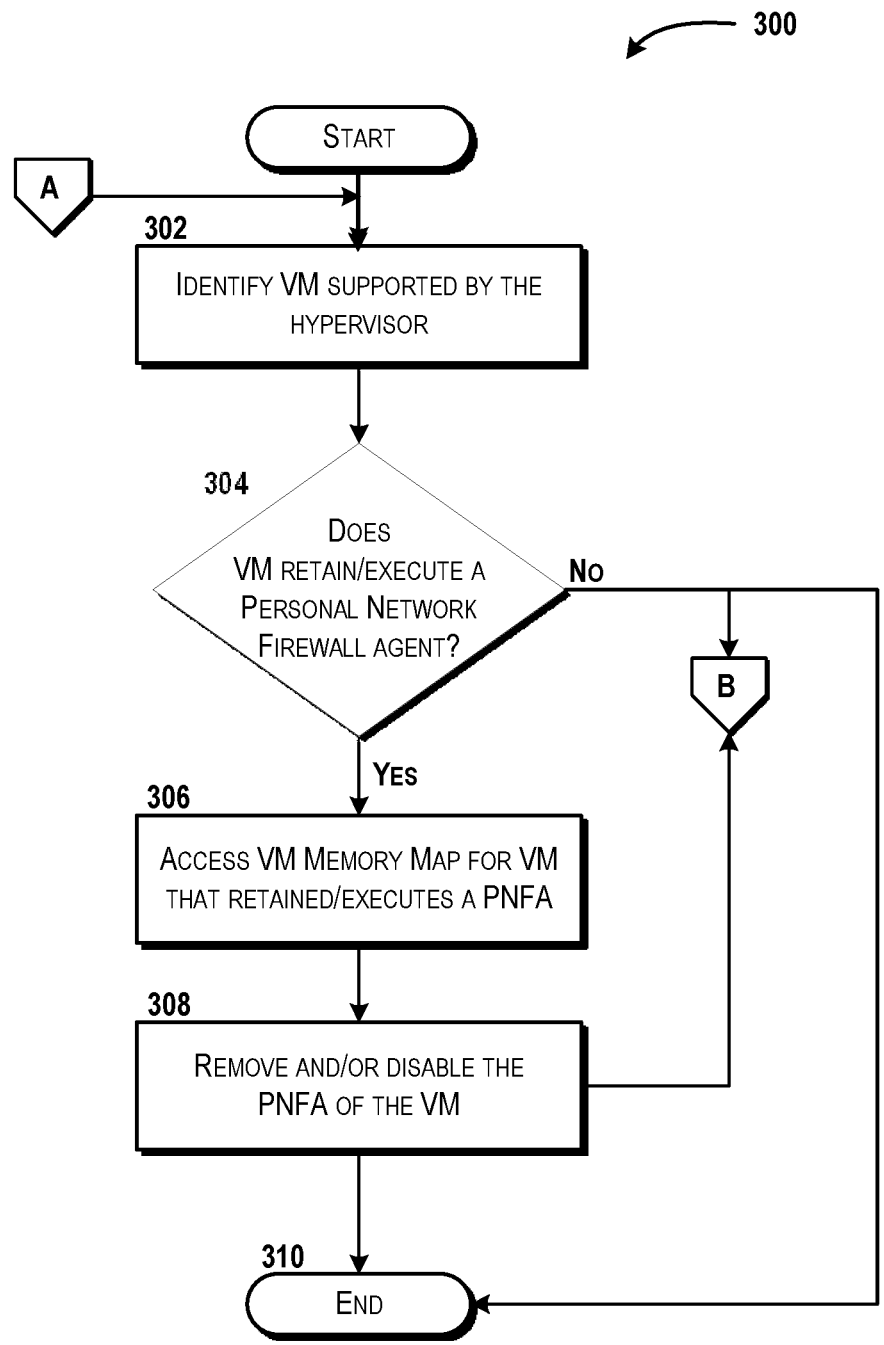
FIG. 3 is a flow diagram illustrating aspects of another method for agentless personal network firewall security in virtualized datacenters, according to an illustrative embodiment.

Turning now to FIGS. 2 and 3, with continued reference to FIG. 1, aspects of a method 200 and a method 300 for agentless personal network firewall security for virtualized datacenters will be described in detail, according to an illustrative embodiment. It should be understood that each of the operations of the one or more methods disclosed herein (e.g., the method 200 and/or the method 300 discussed below) are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, application modules, program modules, programs, components, data structures, algorithms, and the like. It is understood that use of the term "module" refers to a defined, callable set of computer-readable instructions that provide the performance of one or more operations and functions discussed herein so as to transform, upon execution, processing resources and/or memory resources into a particular, non-generic, machine. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing and transforming a processor of a computing system or device, such as any element within the datacenter 104 (e.g., the host devices 106 and any VM supported within the datacenter 104), the network 102, and/or the unauthorized computing system 103, to perform one or more operations and/or causing the processor to direct other components of the computing system or device to perform one or more of the operations.

For purposes of illustrating and describing the concepts of the present disclosure, the methods disclosed herein are described as being performed by the host device 106 via execution of one or more software modules (i.e., executable data processes that instruct and transform a processor) such as, for example, the HVFA 120 and the hypervisor 114 that configure one or more processors 108 of the host device 106. It should be understood that additional and/or alternative devices and/or network elements can, in some embodiments, provide the functionality described herein via execution of one or more modules, applications, and/or other software including, but not limited to, the other instances of the host device 106 within the datacenter 104. Thus, the illustrated embodiments are illustrative, and should not be viewed as being limiting in any way. The methods 200 and 300 will be described with reference to one or more of the FIGS. 1, 2, and 3.

Turning now to FIG. 2, the method 200 for agentless personal network firewall security for virtualized datacenters is provided, according to an embodiment. The method 200 begins at operation 202, where the HVFA 120 can receive an inbound communication request that is directed to a VM associated with and supported by the hypervisor 114. For example, the HVFA 120 can receive the vDCCR 152 that is directed to the VM A 130, where the VM A 130 is supported by the hypervisor 114. In some embodiments, the vDCCR 152 may have been generated and sent by another VM supported by the hypervisor 114, such as by the vApp 146 executing on the VM B 140. In other embodiments, the vDCCR 152 may have been generated and sent by a device outside of the datacenter 104, such as the unauthorized computing system 103. It should be understood that the examples provided are for illustration purposes only, and therefore should not be construed as limiting in any way.

From operation 202, the method 200 can proceed to operation 204, where the HVFA 120 can identify, based on the inbound communication request, a virtual port associated with the VM that is the target of the request. For example, the vDCCR 152 may be directed to the VM A 130, and thus be considered as an inbound communication request. The HVFA 120 can inspect the vDCCR 152 to identify the destination port 157, which can correspond with the vPort 131 of the VM A 130 that is the target of the vDCCR 152. In an embodiment, the method 200 can proceed from operation 204 to operation 206, where the HVFA 120 can query the hypervisor 114 to confirm that a personal firewall agent is not presently executing on the virtual machine that is the target of the inbound communication request. For example, the HVFA 120 may confirm with the hypervisor 114 that no processing resources or memory resources (e.g., the vCPU 132 and/or the vMem 136) are being utilized by a personal network firewall agent. In some embodiments, from operation 206, the method 200 can proceed to an operation of the method 300, which will be discussed below with respect to FIG. 3.

In some embodiments, from either operation 204 or operation 206, the method 200 can proceed to operation 208, where the HVFA 120 can determine whether the inbound communication request lacks an identity of a virtual application process that executes on the virtual machine. For example, the HVFA 120 can inspect the vDCCR 152 to determine whether a vApp process ID (e.g., the vApp process ID 139A associated with the vApp process 139 of the vApp 138 that executes within the VM A 130) is present within the information included within the vDCCR 152. If the HVFA 120 determines that the vDCCR 152 does not identify, and therefore lacks, a vApp process ID (e.g., the vApp process ID 139A of the vApp process 139), then the method 200 can proceed along the YES path to operation 210. If the HVFA 120 determines that the vDCCR 152 does identify, and therefore does not lack, a vApp process ID (e.g., the vApp process ID 139A of the vApp process 139), then the method 200 can proceed along the NO path to operation 214. For clarity, a discussion of the operation 210 will be provided first, and a discussion of the operation 214 will be provided below.

At operation 210, the HVFA 120 can build a virtual machine memory map via the hypervisor 114. For example, in an embodiment, the HVFA 120 can build the VMMM 160 using information from the vDCCR 152 and the hypervisor 114. The HVFA 120 can use the identification of the destination port 157 (which can correspond with the vPort 131 of the VM A 130) to determine a VMPD 162 using the process address space map 116. The HVFA 120 can build the VMMM 160 by reconstructing the kernel socket data structure 168 that can correspond to the virtual machine that identifies the virtual application process which is associated with the destination port but not visible to the hypervisor 114. For example, the kernel socket data structure 168 can correspond with the VM A 130, and the kernel socket data structure 168 identifies the vApp process ID 139A that is associated with the vApp process 139 that is part of the vApp 138 which created the vSocket 134 that binds to the vPort 131 which is the destination port 157 identified in the vDCCR 152, according to an embodiment.

From operation 210, the method 200 can proceed to operation 212, where the HVFA 120 forces the exposure of the virtual application process that is associated with the targeted virtual port based on the creation and analysis of the virtual machine memory map. For example, the HVFA 120 can force exposure of the vApp process 139 by analyzing the VMMM 160 and using the kernel socket data structure 168 of the VMMM 160 to identify the vApp 138 and the vApp process 139 as being associated with the vPort 131 that is the intended target and destination of the vDCCR 152. From operation 212, the method 200 can proceed to operation 214.

At operation 214, the HVFA 120 can inspect the endpoint message criteria 153 of the inbound communication request, such as the vDCCR 152. For example, the HVFA 120 can inspect on or more of the source IP address 155 and the source port 156 that may, in some embodiments, correspond with the VM B 140 and the vPort 141 of the VM B 140. The HVFA 120 also can inspect the destination port 157 and the destination IP address 158 that may, in some embodiments, correspond with the VM A 130 and the vPort 131 of the VM A 130. From operation 214, the method can proceed to operation 216, where the HVFA 120 can determine whether the inbound communication request is permitted to access the virtual application process corresponding to the virtual application that is associated with and bound to the destination port 157 indicated by the request. For example, in some embodiments, the HVFA 120 can pull or otherwise retrieve the set of access parameters 122 that corresponds with the VM A 130 to determine whether the vApp process 139 of the vApp 138 within the VM A 130 is permitted to receive the vDCCR 152 via the vSocket 134 and the vPort 131. The HVFA 120 can analyze and compare the information included within the endpoint message criteria 153 and the identity of the vApp process (e.g., the vApp process ID 139A) to ensure that the destination IP address 158 (e.g., the IP address corresponding to the VM A 130), the destination port 157 (e.g., the vPort 131), the protocol type (e.g., the protocol type of TCP and/or UDP that is permitted for the vPort 131), the vSocket 134, and the vApp process 139 of the vApp 138 are all found within one or more of the access parameters 122 (e.g., one or more of the network communication whitelist 124, the authorized protocol list 126, and the authorized port list 128).

In some embodiments, in response to the HVFA 120 determining that the inbound communication request is permitted to access the virtual application process (e.g., when the vApp process 139 of the vApp 138 is permitted to receive the vDCCR 152), then the method 200 can proceed along the YES path to operation 218, where the HVFA 120 can route the inbound communication request (e.g., the vDCCR 152) to the destination port (e.g., the vPort 131 of the VM A 130). Once the vDCCR 152 is routed to the vPort 131, the VM A 130 can direct the vDCCR 152 to the vApp process 139 of the vApp 138 that executes on the VM A 130. From operation 218, the method 200 can proceed to operation 222, where the method 200 can end.

In some embodiments, in response to the HVFA 120 determining that the inbound communication request is not permitted to access the virtual application process (e.g., if the vApp process 139 of the vApp 138 is not permitted to receive the vDCCR 152) at operation 216, then the method 200 can proceed along the NO path to operation 220, where the HVFA 120 can prevent the inbound communication request (e.g., the vDCCR 152) from reaching the virtual port that is indicated as being the target destination (e.g., the vPort 131). For example, in some embodiments, the HVFA 120 can prohibit the hypervisor 114 from routing the vDCCR 152 to the vPort 131. The HVFA 120 can instruct the hypervisor 114 to drop, discard, and/or erase the vDCCR 152 such that the vPort 131 (or any other port of the VM A 130) does not receive the vDCCR 152. In some embodiments, the HVFA 120 may create and/or update a log that indicates the number of instances in which a message is not provided to a virtual port of a virtual machine due to the virtual application not having authorization to send and/or receive such messages. In some embodiments, the HVFA 120 can instantiate an alert and inform a network administrator computing system within the network 102 that a message was blocked or otherwise prevented from reaching a virtual machine within the datacenter 104 despite the virtual machine not executing a personal network firewall agent. From operation 220, the method 200 can proceed to operation 222, where the method 200 can end.

Turning now to FIG. 3, a method 300 for agentless personal network security for virtualized datacenters is disclosed, according to an embodiment. In some embodiments, the method 300 can proceed from any of the operations discussed above with respect to the method 200. In some embodiments, one or more operations of the method 300 can occur prior to one or more operations of the method 200 discussed above. It should be understood that the examples provided are for illustration purposes only, and therefore should not be construed as limiting in any way.

The method 300 can begin at operation 302, where the HVFA 120 can identify a VM that is supported by the hypervisor 114, such as one or more of the VM A 130, the VM B 140, and/or the VM N 150. In some embodiments, the HVFA 120 can also identify any ports corresponding to the VMs, such as the vPort 131 of the VM A 130 and/or the vPort 141 of the VM B 140. From operation 302, the method 300 can proceed to operation 304, where the HVFA 120 can determine whether one or more of the VMs supported by the hypervisor 114 retains, such as via storage within a virtual memory, and/or executes a personal network firewall agent. For example, the HVFA 120 can determine whether the VM that is the source and/or target of a communication message, such as the vDCCR 152, uses an instance of a personal network firewall agent, such as the personal network firewall agent 148. In an embodiment, the HVFA 120 can analyze a storage record that identifies all VMs supported by the hypervisor 114 and indicates if a personal network firewall agent was installed on a VM (e.g., any of the VM A 130, the VM B 140, and the VM N 150), an installation identifier that indicates a time and/or date of when the personal network firewall agent was installed, and a removal identifier that indicates a time and/or date of when the personal network firewall agent was removed, uninstalled, or otherwise disabled within the VM. In an embodiment, if the HVFA 120 determines that the personal network firewall agent does not show up or have a removal identifier within the storage record, then the HVFA 120 can determine that the personal network firewall agent remains and is still retained or otherwise executable by the corresponding VM.

In another embodiment, the HVFA 120 can determine whether a personal network firewall agent is retained, stored, and/or otherwise operates within a VM by querying the hypervisor 114 so as to confirm that a personal network firewall agent is not associated with and/or presently executing on a VM (e.g., the VM B 140). In some embodiments, the HVFA 120 may send a test message to a port of the VM under inquiry (e.g., the vPort 141 of the VM B 140). In an embodiment where the personal network firewall agent 148 is present and executing locally on the VM B 140, if the test message is sent to the vPort 141, then the test message would not be accepted by the VM B 140 because the personal network firewall agent 148 would reject the test message and send a rejection reply indicating that the test message is not permitted. However, if the personal network firewall agent 148 is not present (i.e., not installed within the VM B 140), then the test message may be accepted by the VM B 140, thereby causing the hypervisor 114 and the HVFA 120 not to receive the rejection reply. The test message may be harmless (i.e., the test message does not include a script and/or process that could cause the VM to perform any operations), but the test message may appear to a personal network firewall agent to be a virus (i.e., not harmless) if in fact an instance of a personal network firewall agent is present and executing on the VM. For example, in an embodiment, the personal network firewall agent 148 may be installed and executing within the VM B 140, yet be unauthorized for use according to the HVFA 120. If the HVFA 120 sends the test message to the personal network firewall agent 148, then the test message may be rejected by the personal network firewall agent 148 despite the test message not posing any harm to the VM B 140 (e.g., the test message not being executable by the VM B 140). If the test message is rejected by the personal network firewall agent 148, then the HVFA 120 will receive the rejection reply, thereby confirming that the personal network firewall agent 148 is present and executing within the VM B 140 without authorization. In an embodiment, if the test message is accepted by the VM B 140 (and thus the HVFA 120 does not receive a rejection reply from the VM B 140 in response to the test message), then the HVFA 120 determines that the personal network firewall agent 148 is not stored and is not running on the VM B 140.

In an embodiment where the HVFA 120 confirms that a personal network firewall agent is not stored and/or is not executing on the VM, then the method 300 proceed along the NO path from operation 304 to operation 310, where the method 300 can end. In some embodiments, the method 300 can proceed along the NO path from operation 304 to an operation of the method 200 discussed above with respect to FIG. 2.

In an embodiment where the HVFA 120 confirms that the VM stores and executes a personal network firewall agent, then the method 300 can proceed along the YES path to operation 306. At operation 306, the HVFA 120 can access a virtual machine memory map corresponding to the VM that has the personal network firewall agent installed thereon. For example, in an embodiment, the VMMM 160 can include information that corresponds with one or more VMs, such as the VM B 140 that can have the personal network firewall agent 148 stored within the vMem 144. In an embodiment, the HVFA 120 can identify the vPort 141 corresponding to the VM B 140 and use the identity of the vPort 141 to find a VMPD corresponding to the VM B 140. The HVFA 120 can "walk" (i.e., analyze and identify) a virtual memory address that is used by a page table of the VM B 140, which in turn can identify a kernel socket data structure that can list any operations that may use virtual sockets, such as the personal network firewall agent 148. The VMMM 160 can return, to the HVFA 120, a memory address within the memory 110 that is linked with the vMem 144 that the personal network firewall agent 148 uses and/or is otherwise allocated by the hypervisor 114.

From operation 306, the method 300 can proceed to operation 308, where the HVFA 120 can remotely and/or otherwise disable the personal network firewall agent 148 of the VM B 140. For example, the HVFA 120 may sever or remove the allocation of processing resources (e.g., from the processor 108) and/or memory resources (e.g., from the memory 110) that previously were linked to the vCPU 142 and/or the vMem 144 of the VM B 140. By this, the HVFA 120 can control network firewall security without any personal network firewall agents operating within a VM supported by the hypervisor 114. In an embodiment, from operation 308, the method 300 can proceed to one or more operations of method 200 discussed above with respect to FIG. 2. In some embodiments, the method 300 can proceed from operation 308 to operation 310, where the method 300 can end.

Figure 4:
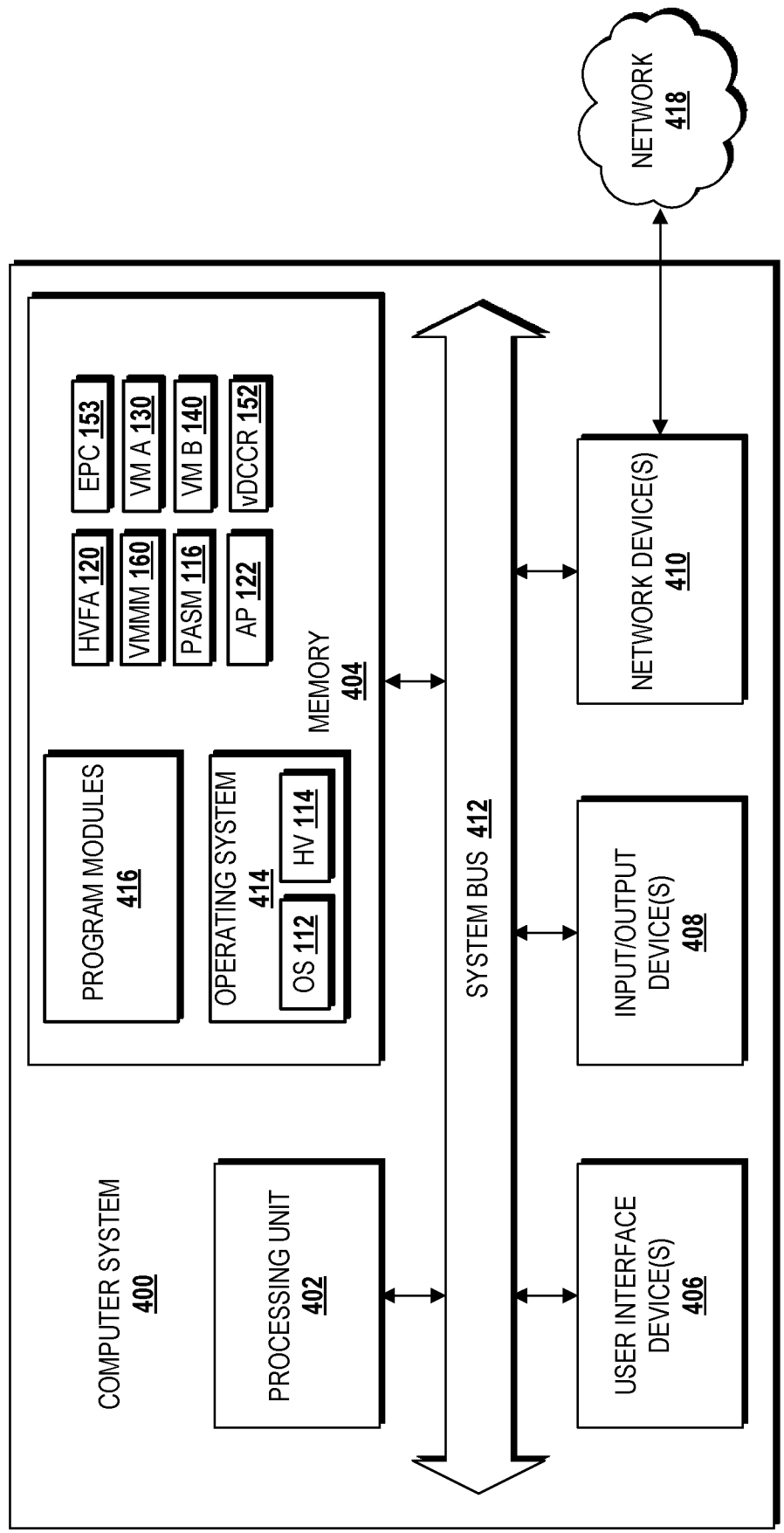
FIG. 4 is a block diagram illustrating an example computer system capable of implementing aspects of the embodiments presented and described herein.

Turning now to FIG. 4, a block diagram is provided illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the host devices 106 of the datacenter 104 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 402 can include one or more central processing units ("CPUs") configured with one or more processing cores, and/or one or more graphics processing unit ("GPU") configured to accelerate operations performed by one or more CPUs. The processing unit 402 can include one or more system-on-chip ("SoC") components along with one or more other components, including, for example, one or more of the memory resources, and/or one or more of the other resources. Processing units are generally known, and therefore are not described in further detail herein. It is understood that the processors 108 of the datacenter 104 can be implemented as one or more processing unit 402.

The memory 404 communicates with the processing unit 402 via the system bus 412. In various embodiments, the memory 110 of the host device 106 within the datacenter 104 can be implemented as the memory 404. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the HVFA 120, the hypervisor 114, and/or other program modules. These and/or other programs can be embodied in computer-readable medium including instructions that, when executed by the processing unit 402, in some embodiments, may perform and/or facilitate performance of one or more of the operations discussed with respect to FIGS. 1, 2, and 3, described in detail above. According to some embodiments, the program modules 416 may be embodied in hardware, software, firmware, or any combination thereof. In some embodiments, the memory 404 also can be configured to store the VMMM 160, the process address space map 116, the access parameters 122, the vDCCR 152, the endpoint message criteria 153, the VM A 130, the VM B 140, the VM N, 150, and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 102 and/or the network 600. Examples of the network devices 410 include, but are not limited to, a modem, a radio frequency ("RF") or infrared ("IR") transceiver, a telephonic interface, a bridge, a router, or a network card. The network devices 410 may support communication and functionality with the network 418, such as via physical network functions, virtual network functions, virtual and/or physical edge devices, or the like. The network devices 410 can, in some embodiments, include one or more host devices 106 discussed with respect to the datacenter 104 of FIG. 1. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, or additionally, the network 418 may be or may include a wired network such as, but not limited to, a Wide Area Network ("WAN"), a wired Personal Area Network ("PAN"), a wired Metropolitan Area Network ("MAN"), an optical network, a VoIP network, an IP/MPLS network, a PSTN network, an IMS network, an EPC network, or any other mobile network and/or wireline network.

Figure 5:
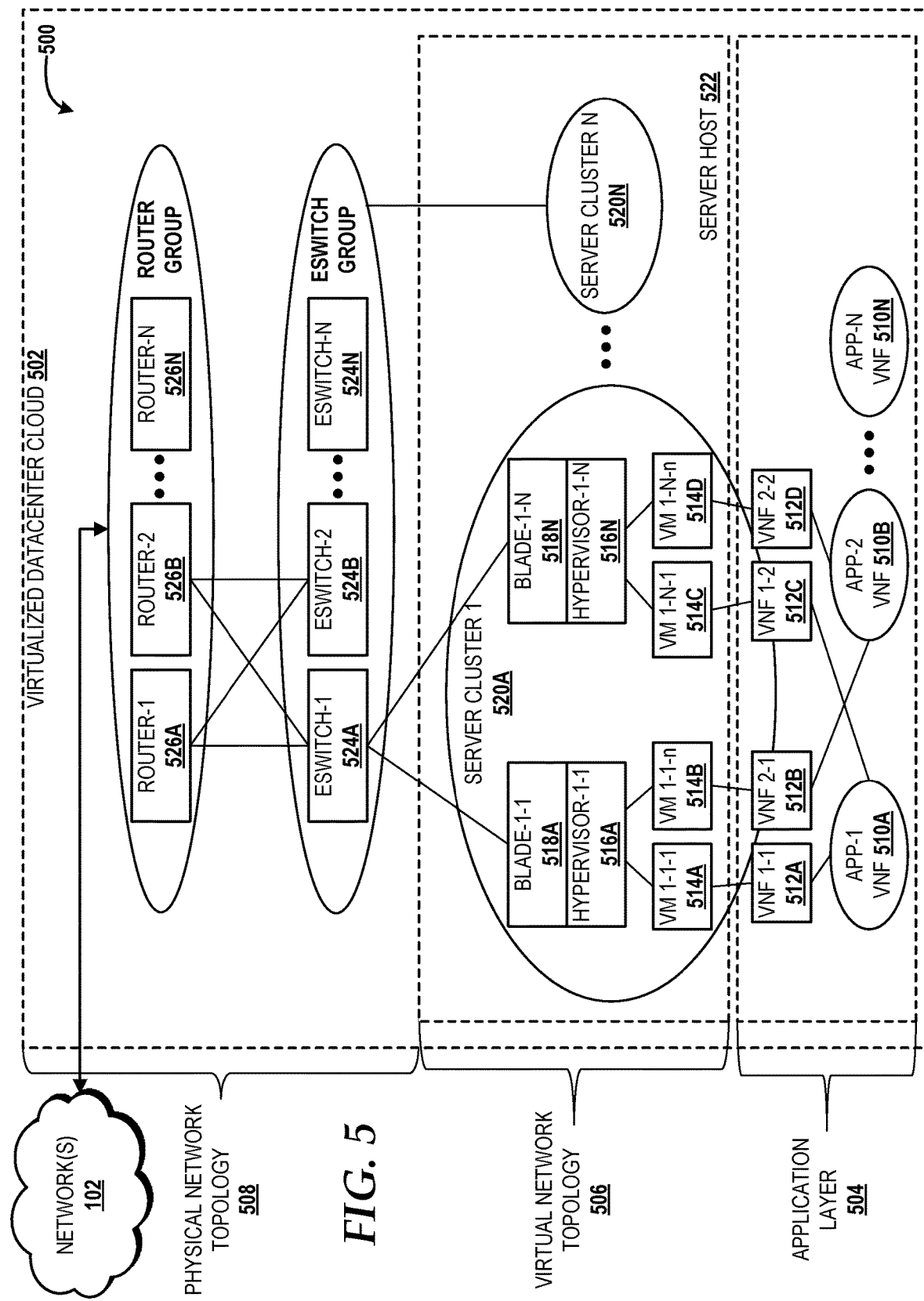
FIG. 5 is a diagram illustrating a network topology for a virtualized datacenter cloud capable of implementing aspects of the concepts and technologies described herein according embodiments of the present disclosure.

Turning now to FIG. 5, a network topology 500 for a virtualized data center cloud 502 will be described, according to an illustrative embodiment. In some embodiments, at least a portion of the datacenter 104 can be configured according to embodiments of the network topology 500. The illustrated network topology 500 includes three layers: an application ("APP") layer 504, a virtual network topology layer 506, and a physical network topology layer 508. The APP layer 504 can include one or more application virtualized network function ("VNFs") 510A-510N, each of which can be divided into one or more sub-VNFs 512A-512D (referred to herein collectively as sub-VNFs 512) to be executed by one or more VMs 514A-514D (referred to herein collectively as VMs 514), such as the VMs 130, 140, and 150. In context of the concepts and technologies disclosed herein, the VNFs 510A-510N can include virtual processing network functions for one or more vApps of the datacenter 104.

The virtual network topology layer 506 includes the VMs 514, one or more hypervisors 516A-516N (referred to herein collectively as hypervisors 516), and one or more server modules ("blades") 518A-518N 518A 518D (referred to herein collectively as blades 518). Each blade 518 can support one hypervisor 516 that, in turn, can manage one or more of the VMs 514. The blades 518 provide computing capacity to support the VMs 514 carrying the sub-VNFs 512. The hypervisors 516 provide resource management among the VMs 514 supported thereby. A logical server cluster 520 is created for resource allocation and reallocation purpose, which includes the blades 518 in the same instance of the server host 522. Each instance of the server host 522 includes one or more of the logical server clusters 520A-520N (referred to herein collectively as server clusters 520).

The physical network topology layer 508 includes an Ethernet switch ("ESwitch") group, including one or more ESwitches 524A-524N (referred to herein collectively as ESwitches 524). The physical network topology layer 508 also includes a router group, including one or more routers 526A-526N (referred to herein collectively as routers 526). The ESwitch group provides traffic switching function among the blades 518. The router group provides connectivity for traffic routing between the virtualized data center cloud 502 and the network(s) 102. The routers 526 may or may not provide multiplexing functions, depending upon network design. In some embodiments, the physical network topology layer 508 can correspond with one or more instances of the host device 106.

The virtual network topology layer 506 is dynamic by nature, and as such, the VMs 514 can be moved among the blades 518 as needed. The physical network topology layer 508 is more static, and as such, no dynamic resource allocation is involved in this layer. Through such a network topology configuration, the association among application VNFs 510, the VM 514 supporting the application VNFs 510, and the blade 518 that hosts the VM 514 can be determined. In some embodiments, the operating system 112, the hypervisor 114, and the HVFA 120 can operate within the virtual network topology layer 506.

In the illustrated example, a first VNF is divided into two sub-VNFs, VNF 1-1 512A and VNF 1-2 512C, which is executed by VM 1-1-1 514A and VM 1-N-1 514C, respectively. The VM 1-1-1 514A is hosted by the blade 1-1 518A and managed by the hypervisor 1-1 516A in the server cluster 1 520A of the server host 522. Traffic switching between the blade 1-1 518A and the blade 1-N 518N is performed via ESwitch-1 524A. Traffic communications between the ESwitches 524 and the network(s) 102 can be performed via the routers 526. In this example, the VM 1-1 514A can be moved from the blade 1-1 518A to the blade 1-N 518N for VM live migration if the blade 1-1 518A is detected to have difficulty supporting the VNF 1-1 512A performance requirements and the blade 1-N 518N has sufficient capacity and is available to support the VNF 1-1 512A performance requirements. The virtual network topology layer 506 is dynamic by nature due to real-time resource allocation/reallocation capability of a cloud software defined network ("SDN"). The association of application, VM, and blade host in this example is the VNF 1-1 512A is executed on the VM 1-1-1 514A hosted by the blade 1-1 518A in the server cluster 1 520A. In some embodiments, the VMs 130, 140, and 150 can operate within or otherwise correspond with the virtual network topology layer 506, and the vApps 138, 146 and the vApp processes 139, 147 can operate within or otherwise correspond with the APP layer 504.

Figure 6:
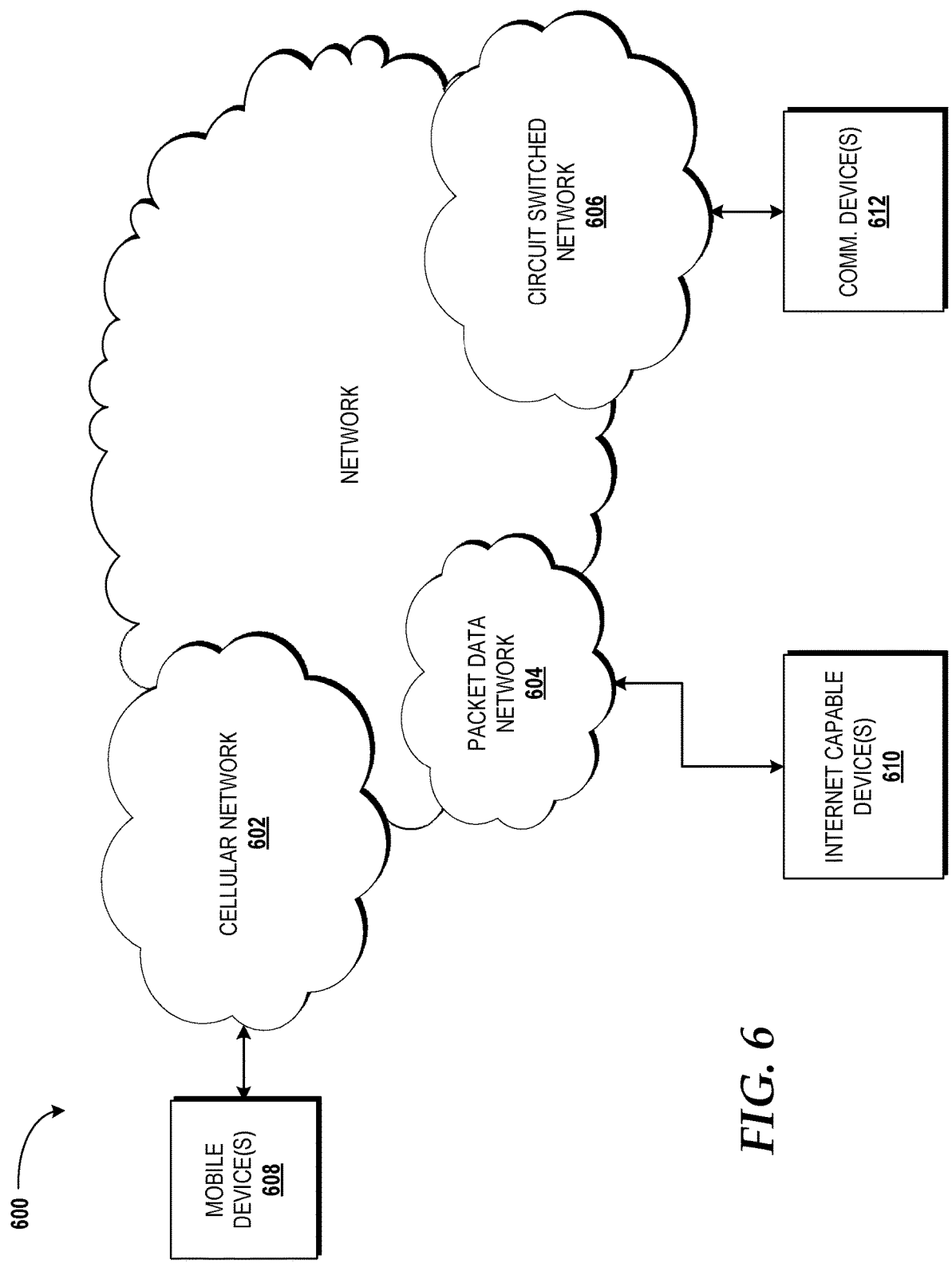
FIG. 6 is a diagram illustrating an example network capable of implementing aspects of the embodiments discussed herein.

Turning now to FIG. 6, details of a network 600 are illustrated, according to an illustrative embodiment. In some embodiments, one or more of the network 102 and/or the network 418 can be configured, at least in part, as the network 600. The network 600 includes a cellular network 602, a packet data network 604, for example, the Internet, and a circuit switched network 606, for example, a PSTN. The cellular network 602 includes various network components such as, but not limited to, base transceiver stations ("BTSs"), NBs, eNBs, gNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), optical transport devices, and the like. The cellular network 602 also includes radios and nodes for receiving and transmitting voice, data, and combinations thereof to and from radio transceivers, networks, the packet data network 604, and the circuit switched network 606. In some embodiments, the network 102 of FIG. 1 can operate, at least in part, as the packet data network 604 and/or as or in cooperation with the cellular network 602.

The mobile communications device 608, such as, for example, a cellular telephone, a mobile terminal, a PDA, a laptop computer, a handheld computer, and combinations thereof, can be operatively connected to the cellular network 602. In some embodiments, the unauthorized computing system 103 can be configured as the mobile communications device 608. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G and 5G mobile communications standards such as LTE, or the like, as well as evolved and future mobile standards, including but not limited to LTE-Advanced, LTE-Advanced Pro and 5G.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (e.g., a "browser") for executing a web page in a format readable by the browser or other software such as executable applications. Other files and/or data may be accessible via "links" in the retrieved files, as is generally known. In some embodiments, the packet data network 604 includes or is in communication with the Internet. In some embodiments, the at least some of the network 102 can be configured as a packet data network, such as the packet data network 604. The circuit switched network 606 includes various hardware and software for providing circuit switched communications. The circuit switched network 606 may include, or may be, what is often referred to as a POTS. In some embodiments, the at least some of the network 102 also can be configured as a circuit switched network, such as the circuit switched network 606. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. In some embodiments, the internet-capable devices 610 can include one or more host device 106 and one or more network elements of the datacenter 104. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network of FIG. 6 is used to refer broadly to any combination of the networks 602, 604, 606 shown in FIG. 6. It should be appreciated that, in some embodiments, substantially all of the functionality described with reference to the network 102 and/or the datacenter 104 can be performed by the cellular network 602, the packet data network 604, and/or the circuit switched network 606, alone or in combination with other networks, network elements, and the like, according at least to aspects of the features and operations discussed herein.

Figure 7:
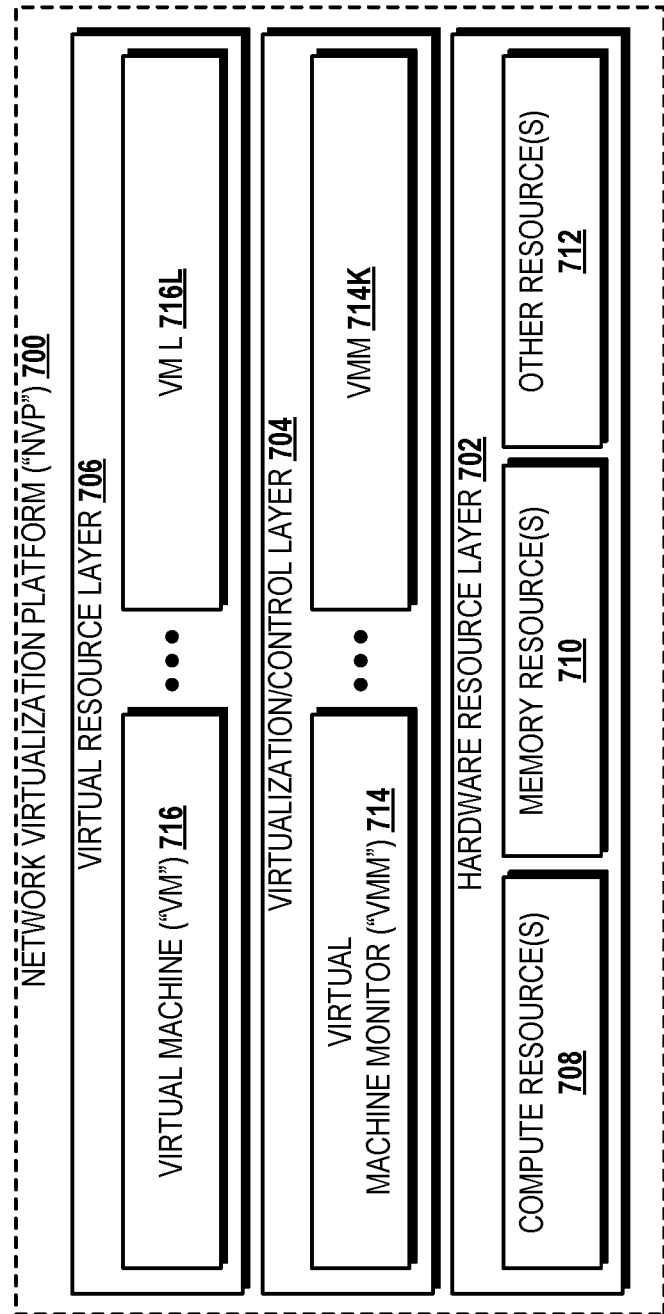
FIG. 7 is a block diagram illustrating a network virtualization platform ("NVP") capable of implementing aspects of the embodiments presented herein.

Turning now to FIG. 7, a block diagram illustrating an illustrative network virtualization platform ("NVP") 700 that can be used to implement, at least in part, the datacenter 104 and/or at least a portion thereof, introduced above in FIG. 1 will be described, according to an illustrative embodiment. For example, in some embodiments, one or more processors 108, the memory 110, the operating system 112, the hypervisor 114, the HVFA 120, any of the VMs 130, 140, and 150, and/or other network elements of the datacenter 104 can be implemented via the NVP 700. The illustrated NVP 700 includes a hardware resource layer 702, a virtualization/control layer 704, and a virtual resource layer 706 that work together to perform operations as will be described in detail herein. The hardware resource layer 702 provides hardware resources, which, in the illustrated embodiment, include one or more compute resources 708, one or more memory resources 710, and one or more other resources 712. In some embodiments, the hardware resource layer 702 can correspond with an embodiment of the host device 106 of the datacenter 104.

The compute resource(s) 708 can include one or more hardware components that perform computations to process data, and/or to execute computer-executable instructions of one or more application programs, operating systems, and/or other software, to provide, at least in part, any services or composition of services described herein. In some embodiments, the processor 108 can correspond with the compute resources 708. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the memory 110 can correspond with the memory resources 710. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures or combinations thereof, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714-714K (also known as "hypervisors;" hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706. In some embodiments, the VMMs 714 can correspond with one or more of the hypervisor 114 and/or the HVFA 120.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). It should be understood, however, that other container technologies can be used and are contemplated. It is understood that as used herein, the term "abstractions" (and variants thereof) is to be interpreted within the realm of networking and computer engineered systems, specifically as a way to describe a layered computer implementation to transform physical, non-generic devices so as to veil an end user from viewing the complexity of network architecture that is executing at lower levels, thereby enabling the transformation of particular machines and implementation of concepts and technologies discussed herein. In no manner shall the term "abstractions" (or variants thereof), be used to interpret or construe the claims in such a way as being directed to an abstract idea or any other judicial exception. In the illustrated embodiment, the virtual resource layer 706 includes VMs 716-716L (hereinafter "VMs 716"). The VMs 716 can execute instructions to provide, at least in part, any services or composition of services described herein, such as but not limited to, the vApps 138, 146. In various embodiments, at least one or more of the VMs 130, 140, and/or 150 can be configured to operate as one or more VMs within the operating environment 100.

Based on the foregoing, it should be appreciated that concepts and technologies directed to agentless personal network firewall security for virtualized datacenters have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein. The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, in response to execution by the processor, cause the processor to perform operations comprising:
      determining whether a virtual machine associated with a hypervisor retains a personal network firewall agent,
      in response to determining that the virtual machine associated with the hypervisor retains the personal network firewall agent, accessing a virtual machine memory map corresponding to the virtual machine, and
      disabling, using the virtual machine memory map corresponding to the virtual machine, the personal network firewall agent of the virtual machine.

2. The system of claim 1, wherein the operations further comprise determining, based at least in part on the virtual machine memory map, a memory address within a memory linked with a virtual memory used by the personal network firewall agent retained by the virtual machine.

3. The system of claim 2, wherein disabling the personal network firewall agent of the virtual machine comprises removing allocation of memory resources that were linked to the virtual memory associated with the memory address used by the personal network firewall agent retained by the virtual machine.

4. The system of claim 1, wherein determining whether the virtual machine associated with the hypervisor retains the personal network firewall agent comprises:
   sending a test message to a port of the virtual machine; and
   confirming that the virtual machine retains the personal network firewall agent in response to the test message not being accepted by the virtual machine.

5. The system of claim 1, wherein the operations further comprise:
   receiving an inbound communication request to the virtual machine;
   identifying a virtual port associated with the virtual machine based on the inbound communication request;
   determining that the inbound communication request lacks an identity of a virtual application process that executes on the virtual machine; and
   forcing exposure of the virtual application process based on the virtual machine memory map.

6. The system of claim 5, wherein the operations further comprise:
   inspecting endpoint message criteria of the inbound communication request; and
   pulling access parameters to determine whether the inbound communication request is permitted to access the virtual application process.

7. The system of claim 6, wherein the operations further comprise in response to determining that the inbound communication request is not permitted to access the virtual application process, preventing the inbound communication request from reaching the virtual port.

8. A method comprising:
- determining, by a processor that hosts a hypervisor of a computer system, whether a virtual machine associated with the hypervisor retains a personal network firewall agent;
- in response to determining that the virtual machine associated with the hypervisor retains the personal network firewall agent, accessing, by the processor that hosts the hypervisor, a virtual machine memory map corresponding to the virtual machine; and
- disabling, by the processor that hosts the hypervisor using the virtual machine memory map corresponding to the virtual machine, the personal network firewall agent of the virtual machine.

9. The method of claim 8, further comprising determining, based at least in part on the virtual machine memory map, a memory address within a memory linked with a virtual memory used by the personal network firewall agent retained by the virtual machine.

10. The method of claim 9, wherein disabling the personal network firewall agent of the virtual machine comprises removing allocation of memory resources that were linked to the virtual memory associated with the memory address used by the personal network firewall agent retained by the virtual machine.

11. The method of claim 8, wherein determining whether the virtual machine associated with the hypervisor retains the personal network firewall agent comprises:
- sending a test message to a port of the virtual machine; and
- confirming that the virtual machine retains the personal network firewall agent in response to the test message not being accepted by the virtual machine.

12. The method of claim 8, further comprising:
- receiving an inbound communication request to the virtual machine;
- identifying a virtual port associated with the virtual machine based on the inbound communication request;
- determining that the inbound communication request lacks an identity of a virtual application process that executes on the virtual machine; and
- forcing exposure of the virtual application process based on the virtual machine memory map.

13. The method of claim 12, further comprising:
- inspecting endpoint message criteria of the inbound communication request; and
- pulling access parameters to determine whether the inbound communication request is permitted to access the virtual application process.

14. The method of claim 13, further comprising in response to determining that the inbound communication request is not permitted to access the virtual application process, preventing the inbound communication request from reaching the virtual port.

15. A computer storage medium having computer-executable instructions stored thereon that, in response to execution by a processor of a computer system that hosts a hypervisor, cause the processor to perform operations comprising:
- determining whether a virtual machine associated with the hypervisor retains a personal network firewall agent;
- in response to determining that the virtual machine associated with the hypervisor retains the personal network firewall agent, accessing a virtual machine memory map corresponding to the virtual machine; and
- disabling using the virtual machine memory map corresponding to the virtual machine, the personal network firewall agent of the virtual machine.

16. The computer storage medium of claim 15, wherein the operations further comprise determining, based at least in part on the virtual machine memory map, a memory address within a memory linked with a virtual memory used by the personal network firewall agent retained by the virtual machine.

17. The computer storage medium of claim 16, wherein disabling the personal network firewall agent of the virtual machine comprises removing allocation of memory resources that were linked to the virtual memory associated with the memory address used by the personal network firewall agent retained by the virtual machine.

18. The computer storage medium of claim 15, wherein determining whether the virtual machine associated with the hypervisor retains the personal network firewall agent comprises:
- sending a test message to a port of the virtual machine; and
- confirming that the virtual machine retains the personal network firewall agent in response to the test message not being accepted by the virtual machine.

19. The computer storage medium of claim 15, wherein the operations further comprise:
- receiving an inbound communication request to the virtual machine;
- identifying a virtual port associated with the virtual machine based on the inbound communication request;
- determining that the inbound communication request lacks an identity of a virtual application process that executes on the virtual machine; and
- forcing exposure of the virtual application process based on the virtual machine memory map.

20. The computer storage medium of claim 19, wherein the operations further comprise:
- inspecting endpoint message criteria of the inbound communication request;
- pulling access parameters to determine whether the inbound communication request is permitted to access the virtual application process; and
- in response to determining that the inbound communication request is not permitted to access the virtual application process, preventing the inbound communication request from reaching the virtual port.

* * * * *